(12) United States Patent
Ikriannikov

(10) Patent No.: US 8,890,644 B2
(45) Date of Patent: Nov. 18, 2014

(54) TWO-PHASE COUPLED INDUCTORS WHICH PROMOTE IMPROVED PRINTED CIRCUIT BOARD LAYOUT

(75) Inventor: Alexandr Ikriannikov, Castro Valley, CA (US)

(73) Assignee: Volterra Semiconductor LLC, San Jose, CA (US)

( * ) Notice: Subject to any disclaimer, the term of this patent is extended or adjusted under 35 U.S.C. 154(b) by 0 days.

(21) Appl. No.: 13/460,363

(22) Filed: Apr. 30, 2012

(65) Prior Publication Data

US 2012/0212311 A1    Aug. 23, 2012

Related U.S. Application Data

(63) Continuation of application No. 12/786,316, filed on May 24, 2010, now Pat. No. 8,174,348, which is a continuation-in-part of application No. 12/643,957, filed on Dec. 21, 2009, now Pat. No. 7,994,888.

(51) Int. Cl.
| | |
|---|---|
| H01F 27/29 | (2006.01) |
| H01F 27/02 | (2006.01) |
| H01F 5/00 | (2006.01) |
| H02M 7/00 | (2006.01) |
| H01F 27/30 | (2006.01) |
| H01F 27/28 | (2006.01) |
| H01F 17/06 | (2006.01) |
| H02M 3/158 | (2006.01) |

(52) U.S. Cl.
CPC ............ *H01F 17/06* (2013.01); *H02M 3/1584* (2013.01); *H02M 7/003* (2013.01); *H01F 27/306* (2013.01); *H01F 27/2847* (2013.01); *H01F 27/292* (2013.01)
USPC ............ 336/192; 336/83; 336/200; 336/223; 336/232

(58) Field of Classification Search
CPC ...................................... H01F 27/292
USPC .................... 336/200, 223, 232, 192
See application file for complete search history.

(56) References Cited

U.S. PATENT DOCUMENTS

| | | | |
|---|---|---|---|
| 2,212,543 | A | 8/1940 | Jovy |
| 3,878,495 | A | 4/1975 | Thomas |

(Continued)

FOREIGN PATENT DOCUMENTS

| | | |
|---|---|---|
| DE | 37 03 561 | 8/1988 |
| EP | 0 012 629 | 6/1980 |

(Continued)

OTHER PUBLICATIONS

S. Chandrasekaran et al., "Integrated Magnetics for Interleaved DC-Dc Boost for Fuel Cell Powered Vehicles," 35th Annual IEEE Power Electronics Specialists Conferences, 356-61 (2004).

(Continued)

*Primary Examiner* — Elvin G Enad
*Assistant Examiner* — Ronald Hinson
(74) *Attorney, Agent, or Firm* — Lathrop & Gage LLP

(57) ABSTRACT

Two-phase coupled inductors including a magnetic core, at least a first winding, and at least three solder tabs. Power supplies including a printed circuit board, a two-phase coupled inductor affixed to the printed circuit board, and first and second switching circuits affixed to the printed circuit board. Each of the first and second switching circuits are electrically coupled to a respective solder tab of the two-phase coupled inductor affixed to the printed circuit board.

9 Claims, 26 Drawing Sheets

(56) References Cited

U.S. PATENT DOCUMENTS

| | | | |
|---|---|---|---|
| 4,455,545 A | 6/1984 | Shelly | |
| 4,488,136 A | 12/1984 | Hansen et al. | |
| 4,531,085 A | 7/1985 | Mesenhimer | |
| 4,543,554 A | 9/1985 | Muellenheim et al. | |
| 4,636,752 A | 1/1987 | Saito | |
| 5,003,277 A | 3/1991 | Sokai et al. | |
| 5,123,989 A | 6/1992 | Horiishi et al. | |
| 5,161,098 A | 11/1992 | Balakrishnan | |
| 5,177,460 A | 1/1993 | Dhyanchand et al. | |
| 5,182,535 A | 1/1993 | Dhyanchand | |
| 5,204,809 A | 4/1993 | Andresen | |
| 5,225,971 A | 7/1993 | Spreen | |
| 5,436,818 A | 7/1995 | Barthold | |
| 5,469,334 A | 11/1995 | Balakrishnan | |
| 5,565,837 A | 10/1996 | Godek et al. | |
| 5,568,111 A | 10/1996 | Metsler | |
| 5,574,420 A | 11/1996 | Roy et al. | |
| 5,764,500 A | 6/1998 | Matos | |
| 5,939,966 A | 8/1999 | Shin'Ei | |
| 6,018,468 A | 1/2000 | Archer et al. | |
| 6,060,977 A | 5/2000 | Yamamoto et al. | |
| 6,114,932 A | 9/2000 | Wester et al. | |
| 6,147,584 A | 11/2000 | Shin'el | |
| 6,198,375 B1 | 3/2001 | Shafer | |
| 6,204,744 B1 | 3/2001 | Shafer et al. | |
| 6,342,778 B1 | 1/2002 | Catalano et al. | |
| 6,348,848 B1 | 2/2002 | Herbert | |
| 6,356,179 B1 | 3/2002 | Yamada | |
| 6,362,986 B1 | 3/2002 | Schultz et al. | |
| 6,377,155 B1 | 4/2002 | Allen et al. | |
| 6,449,829 B1 | 9/2002 | Shafer | |
| 6,460,244 B1 | 10/2002 | Shafer et al. | |
| 6,549,111 B1 | 4/2003 | De Graaf et al. | |
| 6,578,253 B1 | 6/2003 | Herbert | |
| 6,714,428 B2 | 3/2004 | Huang et al. | |
| 6,737,951 B1 | 5/2004 | Decristofaro et al. | |
| 6,765,468 B2 | 7/2004 | Chen et al. | |
| 6,774,758 B2 | 8/2004 | Gokhale et al. | |
| 6,784,644 B2 | 8/2004 | Xu et al. | |
| 6,791,444 B1 | 9/2004 | Masuda et al. | |
| 6,867,678 B2 | 3/2005 | Yang | |
| 6,903,648 B2 | 6/2005 | Baumann et al. | |
| 6,922,883 B2 | 8/2005 | Gokhale et al. | |
| 6,965,290 B2 | 11/2005 | Gokhale et al. | |
| 6,980,077 B1 | 12/2005 | Chandrasekaran et al. | |
| 7,023,314 B2 | 4/2006 | Tolle et al. | |
| 7,034,645 B2 | 4/2006 | Shafer et al. | |
| 7,187,263 B2 | 3/2007 | Vinciarelli | |
| 7,199,695 B1 | 4/2007 | Zhou et al. | |
| 7,233,132 B1 | 6/2007 | Dong et al. | |
| 7,239,530 B1 | 7/2007 | Djekic et al. | |
| 7,248,139 B1 | 7/2007 | Podlisk et al. | |
| 7,259,648 B2 | 8/2007 | Matsutani et al. | |
| 7,280,025 B2* | 10/2007 | Sano | 336/200 |
| 7,292,128 B2 | 11/2007 | Hanley | |
| 7,310,039 B1 | 12/2007 | Zhang | |
| 7,315,463 B2 | 1/2008 | Schrom et al. | |
| 7,317,305 B1 | 1/2008 | Stratakos et al. | |
| 7,352,269 B2 | 4/2008 | Li et al. | |
| 7,425,883 B2 | 9/2008 | Matsutani et al. | |
| 7,498,920 B2 | 3/2009 | Sullivan et al. | |
| 7,504,808 B2 | 3/2009 | Schrom et al. | |
| 7,525,406 B1 | 4/2009 | Cheng | |
| 7,525,408 B1 | 4/2009 | Li et al. | |
| 7,548,046 B1 | 6/2009 | Stratakos et al. | |
| 2001/0043135 A1 | 11/2001 | Yamada et al. | |
| 2002/0067234 A1 | 6/2002 | Kung | |
| 2002/0093413 A1* | 7/2002 | Shin'ei | 336/200 |
| 2004/0017276 A1 | 1/2004 | Chen et al. | |
| 2004/0085173 A1 | 5/2004 | Decristofaro et al. | |
| 2005/0024179 A1 | 2/2005 | Chandrasekaran et al. | |
| 2005/0128040 A1 | 6/2005 | Gray et al. | |
| 2006/0049907 A1 | 3/2006 | Liu | |
| 2006/0089022 A1 | 4/2006 | Sano | |
| 2006/0145800 A1* | 7/2006 | Dadafshar et al. | 336/82 |
| 2006/0145804 A1 | 7/2006 | Matsutani et al. | |
| 2006/0158297 A1* | 7/2006 | Sutardja | 336/174 |
| 2006/0197510 A1 | 9/2006 | Chandrasekaran | |
| 2007/0175701 A1 | 8/2007 | Xu et al. | |
| 2007/0176726 A1 | 8/2007 | Xu et al. | |
| 2007/0262840 A1 | 11/2007 | Matsutani et al. | |
| 2007/0268104 A1 | 11/2007 | Chan et al. | |
| 2008/0012674 A1 | 1/2008 | Sano et al. | |
| 2008/0024259 A1 | 1/2008 | Chandrasekaran et al. | |
| 2008/0136576 A1 | 6/2008 | Emmons et al. | |
| 2008/0150666 A1 | 6/2008 | Chandrasekaran et al. | |
| 2008/0169769 A1 | 7/2008 | Lee | |
| 2008/0205098 A1 | 8/2008 | Xu et al. | |
| 2008/0246577 A1 | 10/2008 | Sullivan et al. | |
| 2009/0179723 A1* | 7/2009 | Ikriannikov et al. | 336/200 |
| 2009/0231081 A1 | 9/2009 | Ikriannikov et al. | |
| 2009/0237197 A1 | 9/2009 | Ikriannikov et al. | |
| 2010/0007453 A1 | 1/2010 | Yan et al. | |
| 2010/0007457 A1 | 1/2010 | Yan et al. | |
| 2010/0013587 A1 | 1/2010 | Yan et al. | |
| 2010/0271161 A1 | 10/2010 | Yan et al. | |
| 2011/0018669 A1 | 1/2011 | Ikriannikov | |
| 2011/0032068 A1 | 2/2011 | Ikriannikov | |
| 2011/0035607 A1 | 2/2011 | Ikriannikov | |
| 2012/0056704 A1 | 3/2012 | Nagano et al. | |
| 2012/0134180 A1 | 5/2012 | Watanabe et al. | |

FOREIGN PATENT DOCUMENTS

| | | |
|---|---|---|
| EP | 0 142 207 | 5/1985 |
| EP | 1 519 392 | 3/2005 |
| EP | 1 632 964 | 3/2006 |
| EP | 1 835 165 | 9/2007 |
| EP | 1 835 604 | 9/2007 |
| EP | 1 950 773 | 7/2008 |
| JP | 60-015908 | 1/1985 |
| JP | 08-250332 | 9/1996 |
| JP | 2002057049 | 2/2002 |
| JP | 2005310865 | 4/2005 |
| WO | WO 2006/026674 | 3/2006 |
| WO | WO 2009/059069 | 5/2009 |

OTHER PUBLICATIONS

Cooper Bussman, "Product Data Sheet for Low Profile Inductors (Surface Mount)", retrieved from http://www.angilac.com, May 2003.

Dong et al., Twisted Core Coupled Inductors for Microprocessor Voltage Regulators, Power Electronics Specialist Conference, pp. 2386-2392, Jun. 17-21, 2007.

Dong et al, The Short Winding Path Coupled Inductor Voltage Regulators, Applied Power Electronics Conference and Exposition, pp. 1446-1452, Feb. 24-28, 2008.

Dong et al, Evaluation of Coupled Inductor Voltage Regulators, Applied Power Electronics Conference and Exposition, pp. 831-837, Feb. 24-28, 2008.

Panasonic, Power Choke Coil data sheet, 2 pages, Jan. 2008.

Pulse, SMT Power Inductors datasheet, 2 pages, Nov. 2007.

Pulse, SMT Power Inductors Power Beads—PA0766NL Series, pp. 53-55, Mar. 2006.

Pulse, Product News Press Release, dated Nov. 25, 2008, 1 page.

Vishay, Low Profile, High Current IHLP Inductor data sheet, 3 pages.

Vitec, Dual High Freq., High Power Inductor, AF4390A, datasheet, 1 page.

Wong, Pit-Leong, et al., "Investigating Coupling Inductors in the Interviewing" Applied Power Electronics Conference and Exposition, 2000. APEC 2000. Fifteenth Annual IEEE; Mar. 2000; pp. 973-978.

Wong, Pit-Leong, et al.; A Novel Modeling Concept for Multi-coupling Core Structures; Center for Power Electronics Systems; IEEE.

Wong, Pit-Leong, et al.; Performance Improvements of Interleaving VRMs With Coupling Inductors, IEEE Transactions on Power Electronics; vol. 16, No. 4; pp. 499-507; Jul. 2001.

Xu, J., et al; Analysis by Finite Element Method of a Coupled Inductor Circuit Used as Current Injection Interface; IEEE; pp. 147-151; 1996.

(56) References Cited

OTHER PUBLICATIONS

U.S. Appl. No. 12/643,957, Response to Office Action filed May 23, 2011, 19 pages.
U.S. Appl. No. 12/643,957, Non-Final Rejection mailed Feb. 23, 2011, 7 pages.
PCT/US10/60869, International Search Report and Written Opinion mailed May 13, 2011, 14 pages.
U.S. Appl. No. 12/786,316, Notice of Allowance mailed Jan. 6, 2012, 8 pages.
U.S. Appl. No. 12/786,316, Issue Fee Payment and Comments on Statement of Reasons for Allowance filed Apr. 3, 2012, 2 pages.
U.S. Appl. No. 13/175,726, Non-Final Rejection mailed May 30, 2012, 7 pages.
U.S. Appl. No. 13/175,726, Issue Fee Payment filed Dec. 21, 2012, 2 pages.
European Patent Application No. 10 801 317.8, Response to Communication Pursuant to Rules 161 and 162, Feb. 21, 2013, 5 pages.
Notice of Allowance issued in U.S. Appl. No. 13/175,726, dated Sep. 21, 2012, 12 pages.
International Search Report and Written Opinion issued in PCT Patent Application PCT/US2011/037762, dated Nov. 7, 2012, 18 pages.

\* cited by examiner

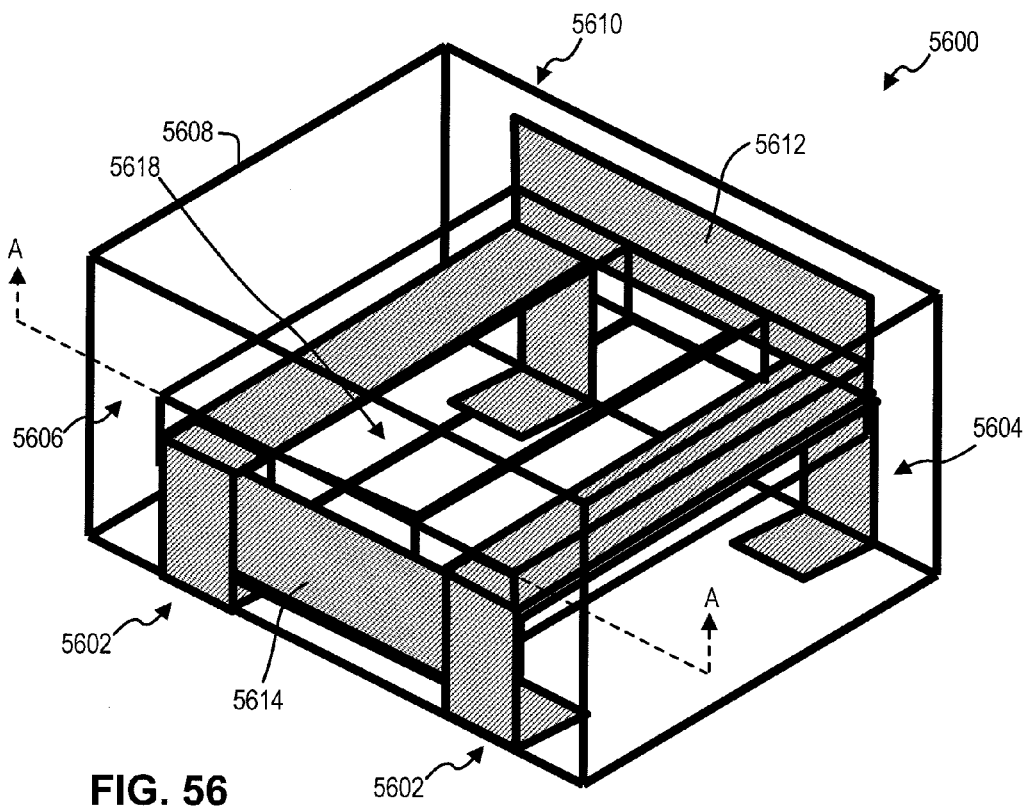
FIG. 56
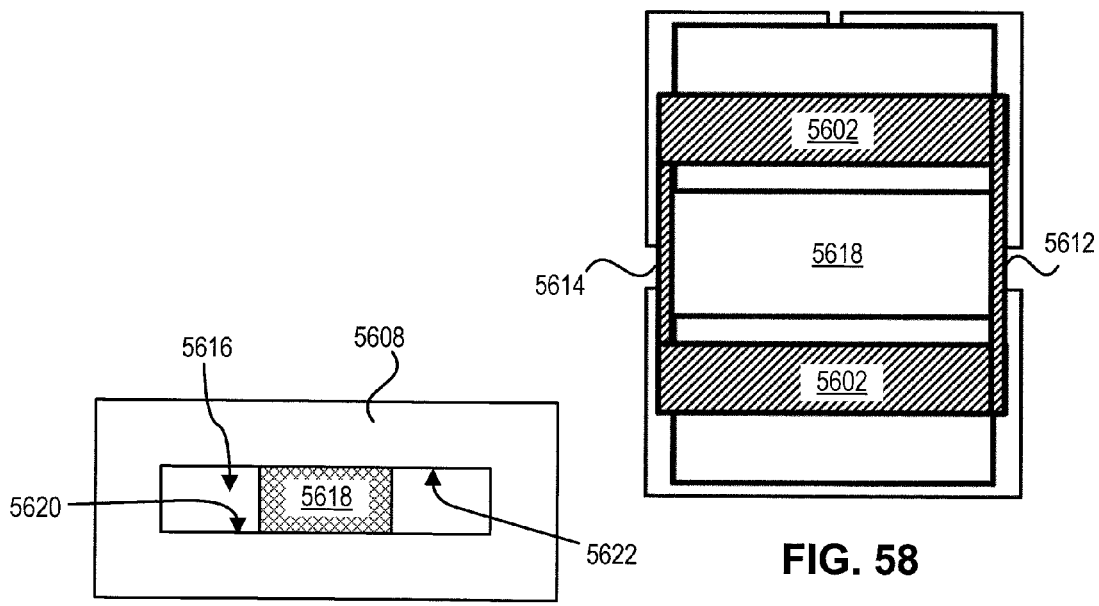
FIG. 57
FIG. 58

TWO-PHASE COUPLED INDUCTORS WHICH PROMOTE IMPROVED PRINTED CIRCUIT BOARD LAYOUT

CROSS-REFERENCE TO RELATED APPLICATIONS

This application is a continuation of U.S. patent application Ser. No. 12/786,316 filed May 24, 2010 now U.S. Pat. No. 8,174,348, which is a continuation in part of U.S. patent application Ser. No. 12/643,957 filed Dec. 21, 2009, now U.S. Pat. No. 7,994,888. Each of the above-identified applications is incorporated herein by reference.

BACKGROUND

Switching DC-to-DC converters having a multi-phase coupled inductor topology are described in U.S. Pat. No. 6,362,986 to Schultz et al., the disclosure of which is incorporated herein by reference. These converters have advantages, including reduced ripple current in the inductors and the switches, which enables reduced per-phase inductance and/or reduced switching frequency over converters having conventional multi-phase DC-to-DC converter topologies. As a result, DC-to-DC converters with magnetically coupled inductors achieve a superior transient response without an efficiency penalty compared with conventional multiphase topologies. This allows a significant reduction in output capacitance resulting in smaller, lower cost solutions.

As known in the art, coupled inductor windings must be inversely magnetically coupled to benefit from a coupled inductor in a multi-phase DC-to-DC converter design. Inverse magnetic coupling in a two-phase DC-to-DC converter can be appreciated with reference to FIG. 1, which shows a schematic of a two-phase DC-to-DC converter 100. DC-to-DC converter 100 includes a coupled inductor 102, which includes two windings 104, 106, and a magnetic core 108 magnetically coupling windings 104, 106. A respective first terminal 110, 112 of each winding 104, 106 electrically couples to a common node 114, and a respective second terminal 116, 118 of each winding 104, 106 electrically couples to a respective switching node 120, 122. In the present disclosure, terminals of a coupled inductor that are electrically coupled to a respective switching node in a DC-to-DC converter application (e.g., terminals 116, 118 in DC-to-DC converter 100 of FIG. 1) will sometimes be referred to as switching terminals of the coupled inductor. Additionally, terminals of a coupled inductor that are electrically coupled to a common node (e.g., terminals 110, 112 in DC-to-DC converter 100 of FIG. 1) will sometimes be referred to as common terminals of the coupled inductor in the present disclosure.

A respective switching circuit 124, 126 is also electrically coupled to each switching node 120, 122. Each switching circuit 124, 126 switches its respective second terminal 116, 118 between at least two different voltage levels. DC-to-DC converter 100 could be configured, for example, as a buck converter, where switching circuits 124, 126 switch their respective second terminal 116, 118 between an input voltage and ground, and common node 114 is an output node. As another example, DC-to-DC converter 100 could be configured as a boost converter, where each switching circuit 124, 126 switches its respective second terminal 116, 118 between an output node and ground, and common node 114 is an input node.

Coupled inductor 102 is configured such at it has inverse magnetic coupling between windings 104, 106. As a result of such inverse magnetic coupling, a current flowing through winding 104 from switching node 120 to common node 114 induces a current in winding 106 flowing from switching node 122 to common node 114. Similarly, a current flowing through winding 106 from switching node 122 to common node 114 induces a current in winding 104 flowing from switching node 120 to common node 114 because of the inverse coupling.

Various coupled inductors have been developed for use in multi-phase DC-to-DC converter applications. For example, FIG. 2 shows a side view of a prior-art two-phase (i.e., two winding) coupled inductor 200. Coupled inductor 200 includes two windings 202 wound through a magnetic core 204. FIG. 3 shows a perspective view of one winding 202 separated from core 204. Although coupled inductor 200's design promotes ease of printed circuit board (PCB) layout and is scalable to more than two-phases, windings 202 are relatively complex, and inductor 200 may therefore be difficult and costly to manufacture. Additionally, windings 202 are relatively long and thus typically have relatively high impedance.

As another example, two-phase coupled inductors with staple style windings have been developed. FIG. 4 shows a perspective view of a prior art two-phase coupled inductor 400, which is representative of such inductors. Coupled inductor 400 includes two staple style windings 402 wound through a magnetic core 404. In contrast to windings 202 of coupled inductor 200, staple style windings 402 are relatively simple, thereby promoting ease of manufacturing and low cost of coupled inductor 400. Additionally, windings 402 have a relatively short length, thereby promoting low DC winding resistance. Therefore, coupled inductor 400 generally has a lower cost and exhibits a lower winding resistance than many other types of prior coupled inductors, such as coupled inductor 200 of FIG. 2.

However, a DC-to-DC converter including coupled inductor 400 must be configured such that one terminal on each side of the inductor is electrically coupled to a respective switching node, to achieve inverse magnetic coupling. Specifically, a DC-to-DC converter including coupled inductor 400 is configured such that one terminal on side 406 is electrically coupled to a respective switching node, and one terminal on side 408 is electrically coupled to a respective switching node, to achieve inverse magnetic coupling. Two terminals on a same side of coupled inductor 400 cannot serve as switching terminals if inverse magnetic coupling is to be realized. Such constraint imposed by coupled inductor 400 is undesirable in many DC-to-DC converter applications, as discussed below.

For example, a DC-to-DC converter including coupled inductor 400 typically must be configured such that the converter's switching circuits are located on different sides of inductor 400. In particular, as known in the art, DC-to-DC converter switching circuits must be located near their respective inductor switching terminals for reliable and efficient DC-to-DC converter operation. For example, in DC-to-DC converter 100 of FIG. 1, switching circuit 124 needs to be located near switching terminal 116, and switching circuit 126 needs to be located near switching terminal 118, for efficient and reliable DC-to-DC converter operation. Thus, in a DC-to-DC converter including coupled inductor 400, inductor switching terminals are on opposite sides of coupled inductor 400 to achieve inverse magnetic coupling, and the DC-to-DC converter switching circuits therefore generally must be located on different (e.g., opposite) sides of coupled inductor 400 to be near their respective inductor switching terminals. It can be undesirable to locate switching circuits on different sides of a coupled inductor as doing so may prohibit use of a common heat sink to cool all switching circuits and/or complicate DC-to-DC converter layout when driving a load accessed from one side of the converter.

As another example, a DC-to-DC converter including coupled inductor 400 may require one or more PCB traces of long, narrow, and/or complex shape to electrically couple terminals of the inductor to other components of the DC-to-DC converter. In particular, if a DC-to-DC converter including coupled inductor 400 is configured such that the inductor switching terminals are on opposite sides of the coupled inductor to achieve inverse magnetic coupling, the DC-to-DC converter necessarily must also be configured such that the inductor common terminals are on opposite sides of the coupled inductor. The fact that the inductor common terminals are on opposite sides of the inductor typically necessitates a relatively long, narrow, and/or complex shaped PCB trace to connect the common terminals to a common node. Narrow or long traces are generally undesirable as they typically have high impedance, which may result in excessive losses and/or unreliable operation. Complex shaped traces (e.g., non-rectangular) may also be undesirable as they may be difficult to manufacture and/or prone to short to other traces.

For example, FIG. 5 shows one prior art PCB layout 500 for use with coupled inductor 400 in a two-phase DC-to-DC converter application. Only the outline of coupled inductor 400 is shown in FIG. 5 to show details for layout 500. Layout 500 includes pads 502, 504, 506, 508 for electrically coupling to terminals of coupled inductor 400. Pads 502, 508, which electrically couple to respective switching nodes, are located on opposite sides 510, 512 of coupled inductor 400 to achieve inverse magnetic coupling. Switching circuits 514, 516 are respectively coupled to pads 502, 508 by conductive PCB traces 518, 520. Switching circuits 514, 516 are also located on opposite sides 510, 512 of coupled inductor 400. Pads 504, 506, which electrically couple to a common node, are also on opposite sides 510, 512 of coupled inductor 400. As a result of pads 504, 506 being on opposite sides of inductor 400 and the location of switching circuits 514, 516, a relatively long and narrow conductive trace 522 is required to connect pads 504, 506 to a common node.

As another example, FIG. 6 shows another prior art PCB layout 600 for use with coupled inductor 400 in a two-phase DC-to-DC converter application. Layout 600 includes pads 602, 604, 606, 608 for electrically coupling to terminals of coupled inductor 400. Pads 602, 608, which electrically couple to a respective switching circuit 610, 612 via a respective conductive trace 614, 616, are located on opposite sides of coupled inductor 400 to achieve inverse magnetic coupling. Pads 604, 606, which, electrically coupled to a common node via a conductive PCB trace 618, are also located on opposite sides of coupled inductor 400. The fact that pads 604, 606 are on opposite sides of coupled inductor 400 and the location of switching circuits 610, 612 requires conductive trace 618 to be relatively long and narrow and to have a complex shape.

SUMMARY

In an embodiment, a two-phase coupled inductor includes a magnetic core, a first winding, and a second winding. The magnetic core includes a first side and a second side opposite the first side, and the magnetic core forms a passageway extending through the core from the first side to the second side. The passageway is partially defined by a first leg of the magnetic core. The first winding is wound at least partially around the first leg and through the passageway. A first end of the first winding extends from the first side of the core and forms a first solder tab, and a second end of the first winding extends from the second side of the core and forms a second solder tab. The second winding is wound at least partially around the first leg and through the passageway. A first end of the second winding extends from the second side of the core and forms a third solder tab, and a second end of the second winding extends from the first side of the core and forms a fourth solder tab. The first, second, third, and fourth solder tabs are separated from each other along a width of the magnetic core. An electric current flowing through the first winding from the first solder tab to the second solder tab induces an electric current flowing through the second winding from the third solder tab to the fourth solder tab. The two-phase coupled inductor may be used, for example, in a multiphase power supply.

In an embodiment, a two-phase coupled inductor includes a magnetic core including a first side and a second side opposite the first side. The magnetic core forms a passageway extending through the core from the first side to the second side, and the passageway is partially defined by a first leg of the magnetic core. The coupled inductor further includes a first winding forming at least two turns around the first leg and wound through the passageway. A first end of the first winding extends from the first side of the core and forms a first solder tab along a bottom surface of the coupled inductor, and a second end of the first winding extends from the second side of the core and forms a second solder tab along the bottom surface of the coupled inductor. An intermediate portion of the first winding between the first and second ends of the first winding forms a third solder tab along the bottom surface of the coupled inductor. The first, second, and third solder tabs are separated from each other along a width of the magnetic core. An electric current flowing through the first winding from the first solder tab to the third solder tab induces an electric current flowing through the first winding from the second solder tab to the third solder tab. The two-phase coupled inductor may be used, for example, in a multiphase power supply.

In an embodiment, a two-phase coupled inductor includes a magnetic core, a first winding, and a second winding. The magnetic core includes a first side opposite a second side, and the magnetic core forms a passageway extending through the core from the first side to the second side. The passageway is partially defined by a first leg of the magnetic core. A first winding is wound at least partially around the first leg and through the passageway. A first end of the first winding extends from the first side of the core and forms a first solder tab, and a second end of the first winding extends from the second side of the core and forms a second solder tab. A second winding is wound at least partially around the first leg and through the passageway. A first end of the second winding extends from the first side of the core and forms a third solder tab, and a second end of the second winding extends from the second side of the core and forms a fourth solder tab. The first winding crosses the second winding within the passageway. The two-phase coupled inductor may be used, for example, in a multiphase power supply.

In an embodiment, a two-phase coupled inductor includes a magnetic core, a first winding, and a second winding. The magnetic core includes a first side opposite a second side, a third side opposite a fourth side, and a fifth side opposite a sixth side. The fifth side connects the first side to the third side. The fifth side forms an obtuse angle with the first side and an obtuse angle with the third side. The sixth side connects the second side to the fourth side. The sixth side forms an obtuse angle with the second side and an obtuse angle with the fourth side. The magnetic core forms a passageway extending through the core from the fifth side to the sixth side, and the passageway is partially defined by a first leg of the magnetic core. The first winding is wound at least partially around the first leg and through the passageway. A first end of the first winding extends from the fifth side of the core and forms a first solder tab, and a second end of the first winding extends from the sixth side of the core and forms a second solder tab. The second winding is wound at least partially around the first leg and through the passageway. A first end of the second winding extends from the fifth side of the core and forms a third solder tab, and a second end of the second winding extends from the sixth side of the core and forms a fourth solder tab. The two-phase coupled inductor may be used, for example, in a multiphase power supply.

In an embodiment, a two-phase coupled inductor includes a magnetic core, a first winding, and a second winding. The magnetic core includes a first side opposite a second side, and the magnetic core forms a passageway extending through the core from the first side to the second side. The passageway is partially defined by first and second opposing surfaces, and the magnetic core includes a first leg connecting the first and second surfaces within the passageway. The first winding is wound at least partially around the first leg. A first end of the first winding extends from the first side of the core and forms a first solder tab, and a second end of the first winding extends from the first side of the core and forms a second solder tab. A second winding is wound at least partially around the first leg. A first end of the second winding extends from the second side of the core and forms a third solder tab, and a second end of the second winding extends from the second side of the core and forms a fourth solder tab. The two-phase coupled inductor may be used, for example, in a multiphase power supply.

BRIEF DESCRIPTION OF DRAWINGS

FIG. 56 shows a perspective view, FIG. 57 shows a side view, and FIG. 58 shows a top cross sectional view of another two-phase coupled inductor, according to an embodiment.

DETAILED DESCRIPTION OF THE EMBODIMENTS

Figure 1:
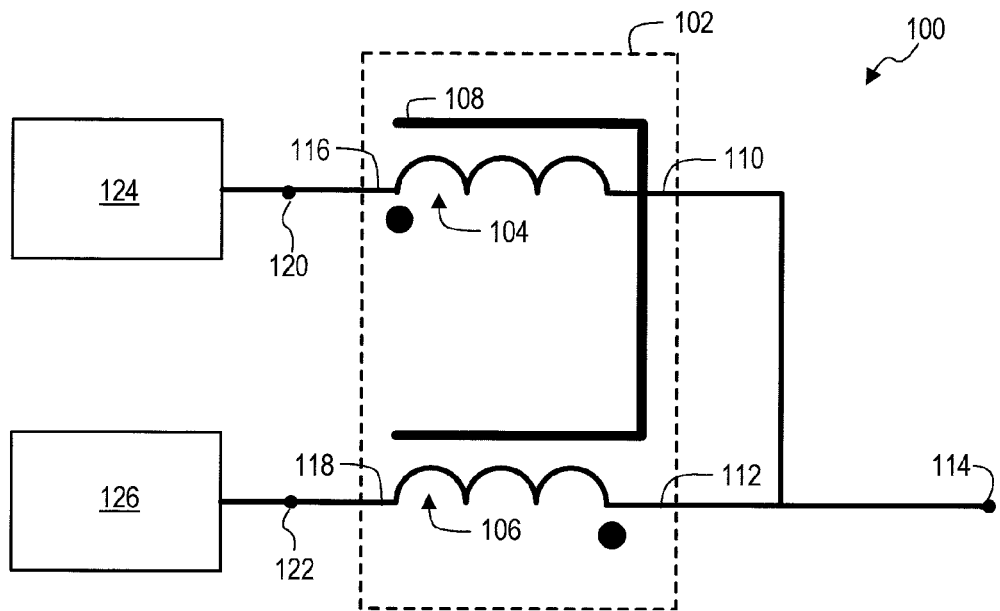
FIG. 1 shows a schematic of a prior-art DC-to-DC converter.

Disclosed herein, among other things, are coupled inductors that may overcome one or more of the problems discussed above. For example, certain embodiments of the coupled inductors disclosed herein not only have relatively short winding lengths, but also may be used in multi-phase DC-to-DC converters configured such that each power stage is disposed on a common side of the coupled inductor. As another example, certain embodiments of the coupled inductors disclosed herein may be used in DC-to-DC converters where a relatively wide, short, and/or simple shaped PCB conductive trace connects the coupled inductors' common terminals to a common node.

Although the coupled inductors disclosed herein are generally discussed in the context of DC-to-DC converters, it should be appreciated that the coupled inductors are not limited to such applications. For example, certain embodiments of the coupled inductors disclosed herein could be used in AC-to-DC power supplies, in DC-to-AC power supplies (inverters), or in applications other than in switching power supplies. Furthermore, although a number of examples of PCB layouts are provided, the inductors disclosed herein could be used in other layouts. Moreover, for purposes of illustrative clarity, certain elements in the drawings may not be drawn to scale. Specific instances of an item may be referred to by use of a numeral in parentheses (e.g., winding 6408(1)) while numerals without parentheses refer to any such item (e.g., windings 6408).

Figure 7:
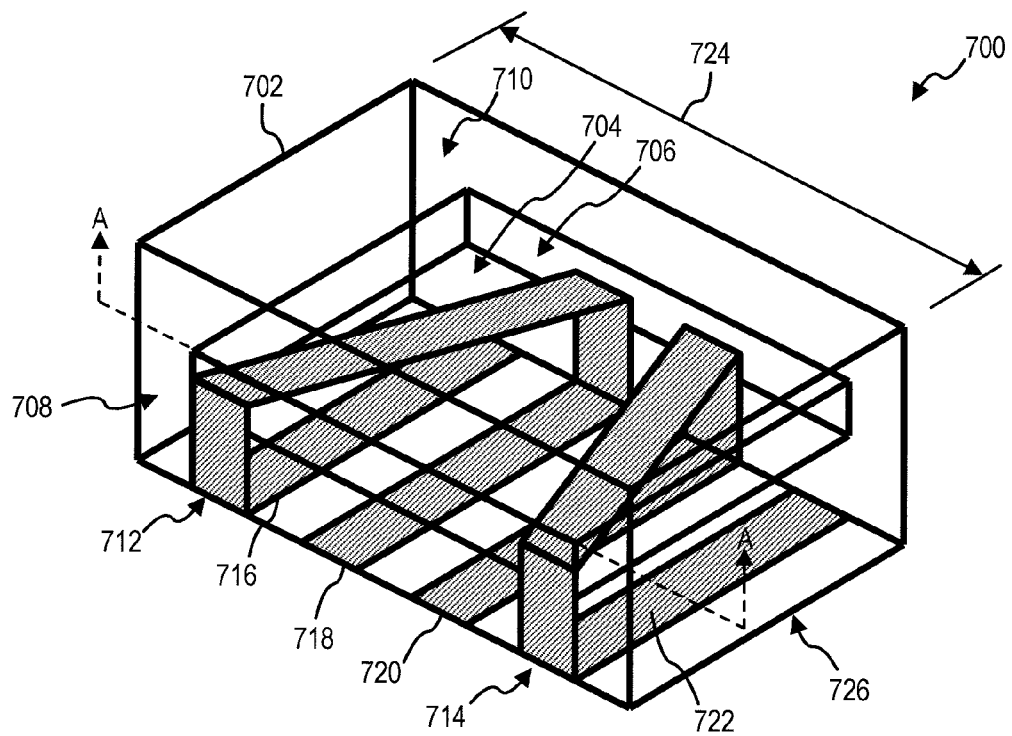
FIG. 7 shows a perspective view.
Figure 8:
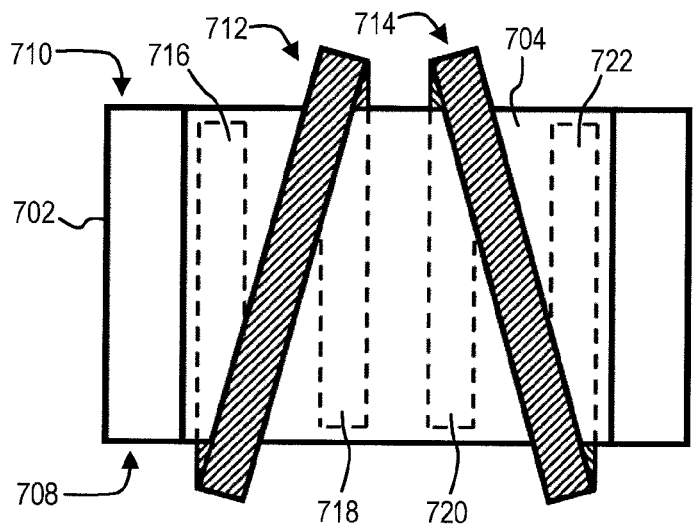
FIG. 8 shows a top cross sectional view.
Figure 9:
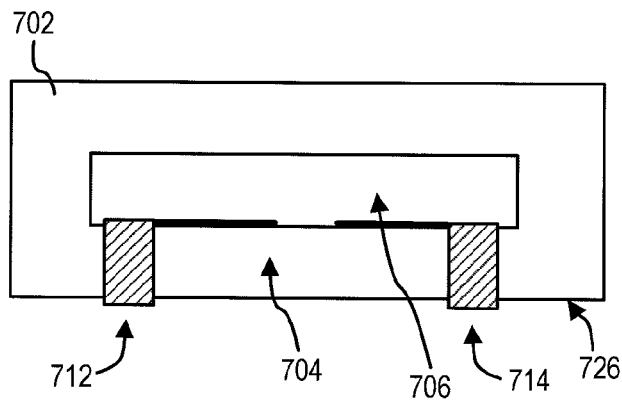
FIG. 9 shows a side view of one two-phase coupled inductor, according to an embodiment.

FIG. 7 shows a perspective view of one two-phase coupled inductor 700. Coupled inductor 700 includes a magnetic core 702, shown as transparent in FIG. 7. Magnetic core 702 includes a leg 704 and forms a passageway 706 from a first side 708 to a second side 710 of core 702. Leg 704 partially defines passageway 706. FIG. 8 shows a top cross-sectional view of inductor 700 taken along line A-A of FIG. 7, and FIG. 9 shows side 708 of coupled inductor 700.

Figure 10:
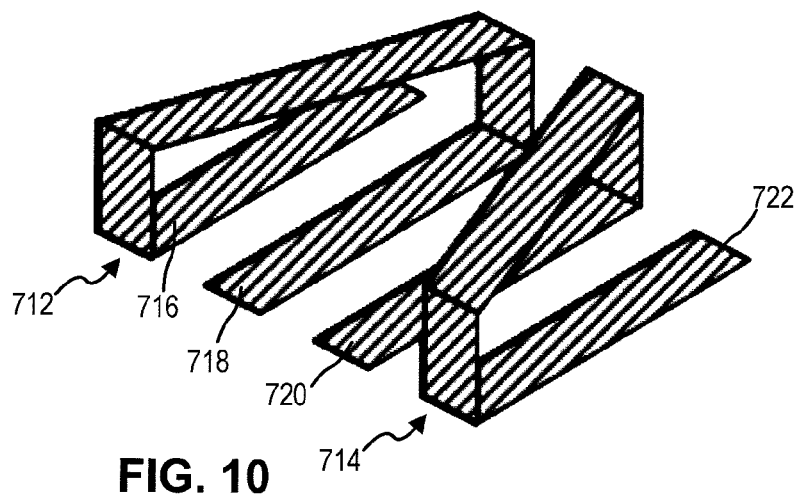
FIG. 10 shows a perspective view of the windings of the coupled inductor of FIGS. 7-9 removed from a magnetic core of the coupled inductor.

Coupled inductor 700 further includes staple style windings 712, 714, which promote ease of manufacturing and low cost of coupled inductor 700, as well as low winding impedance. Windings 712, 714 are, for example, foil windings to minimize the skin effect and thereby promote low AC resistance. Each winding 712, 714 is wound at least partially around leg 704 and through passageway 706 of core 702. A first end of winding 712 extends from first side 708 of core 702 and forms a first solder tab 716, and a second end of winding 712 extends from second side 710 of core 702 and forms a second solder tab 718. A first end of winding 714 extends from second side 710 of core 702 and forms a third solder tab 720, and a second end of winding 714 extends from first side 708 of core 702 and forms a fourth solder tab 722. Each of solder tabs 716, 718, 720, 722 are separated from each other along a width 724 of core 702, and in certain embodiments, solder tabs 716, 718, 720, 722 are laterally adjacent and are at least partially formed along a bottom surface 726 of core 702, as shown. The outline of solder tabs 716, 718, 720, 722 are shown by dashed lines in FIG. 8 where obscured by core 702. FIG. 10 shows a perspective view of windings 712, 714 removed from core 702.

Coupled inductor 700 is configured such that an electric current flowing through winding 712 from first solder tab 716 to second solder tab 718 induces an electric current flowing through winding 714 from third solder tab 720 to fourth solder tab 722. Conversely, an electric current flowing through winding 714 from third solder tab 720 to fourth solder tab 722 induces an electric current flowing through winding 712 from first solder tab 716 to second solder tab 718. In contrast to prior art staple winding coupled inductors, coupled inductor 700's configuration may advantageously allow for coupled inductor 700 to achieve inverse magnetic coupling between windings 712, 714 in multi-phase DC-to-DC converter applications where all switching power stages are disposed on a common side of inductor 700.

Figure 11:
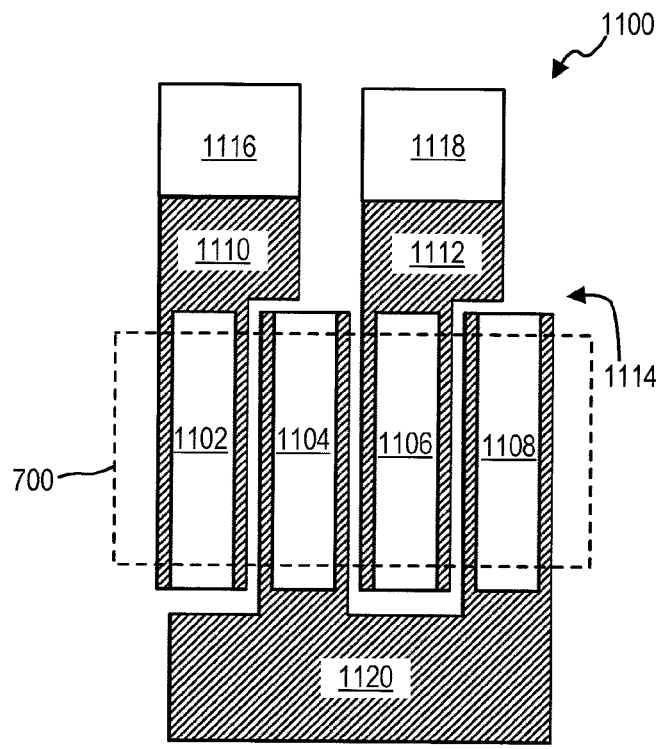
FIG. 11 shows one PCB layout that may be used with certain embodiments of the coupled inductor of FIGS. 7-9.

For example, FIG. 11 shows one PCB layout 1100 for use with an embodiment of coupled inductor 700 in a two-phase DC-to-DC converter application. Layout 1100 includes pads 1102, 1104, 1106, 1108 for respectively connecting to solder tabs 716, 718, 720, 722 of coupled inductor 700. Only the outline of coupled inductor 700 is shown in FIG. 11 to show the pads of layout 1100. A PCB conductive trace 1110, which forms part of a first switching node, electrically couples pad 1102 to a switching circuit 1116, and a PCB conductive trace 1112, which forms part of a second switching node, electrically couples pad 1106 to a switching circuit 1118. PCB conductive trace 1120, which forms part of a common node, electrically couples pads 1104, 1108. Layout 1100 is part of, for example, a buck DC-to-DC converter where switching circuits 1116, 1118 respectively switch solder tabs 716, 720 between an input voltage and ground, and conductive trace 1120 electrically couples to an output node. As another example, layout 1100 could be part of a boost converter DC-to-DC converter where switching circuits 1116, 1118 respectively switch solder tabs 716, 720 between an output voltage and ground, and conductive trace 1120 electrically couples to an input voltage node.

Due to the configuration of coupled inductor 700, traces 1110, 1112 may extend from a common side 1114 of coupled inductor 700, thereby allowing placement of both switching circuits 1116, 1118 on the same side of coupled inductor 700, as shown in FIG. 11. It should also be appreciated that a PCB conductive trace 1120, which connects pads 1104, 1108 to a common node, is short and wide and has simple, substantially rectangular shape. Furthermore, certain embodiments of coupled inductor 700 may be used with a PCB layout designed for use with coupled inductor 200 of FIG. 2, thereby potentially allowing for coupled inductor 700 to be used as a lower cost, lower winding resistance, drop-in replacement for coupled inductor 200.

Figure 2:
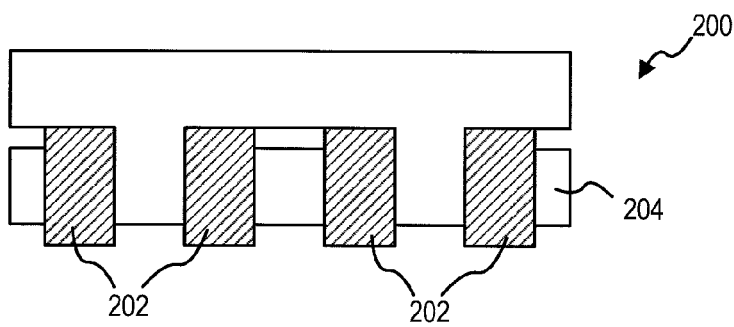
FIG. 2 shows a side view of a prior-art coupled inductor.
Figure 3:
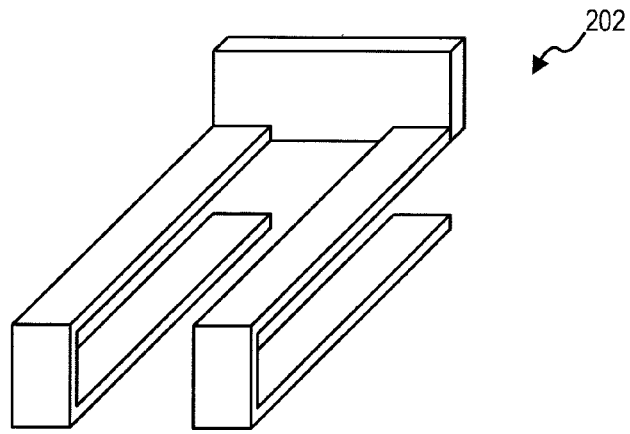
FIG. 3 shows a perspective view of a winding of the FIG. 2 coupled inductor.
Figure 4:
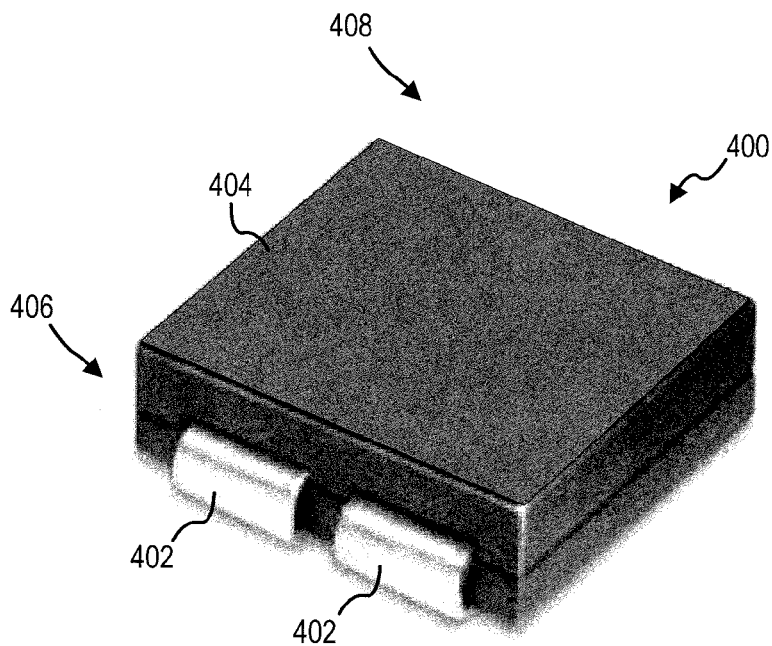
FIG. 4 shows a perspective view of another prior-art coupled inductor.
Figure 5:
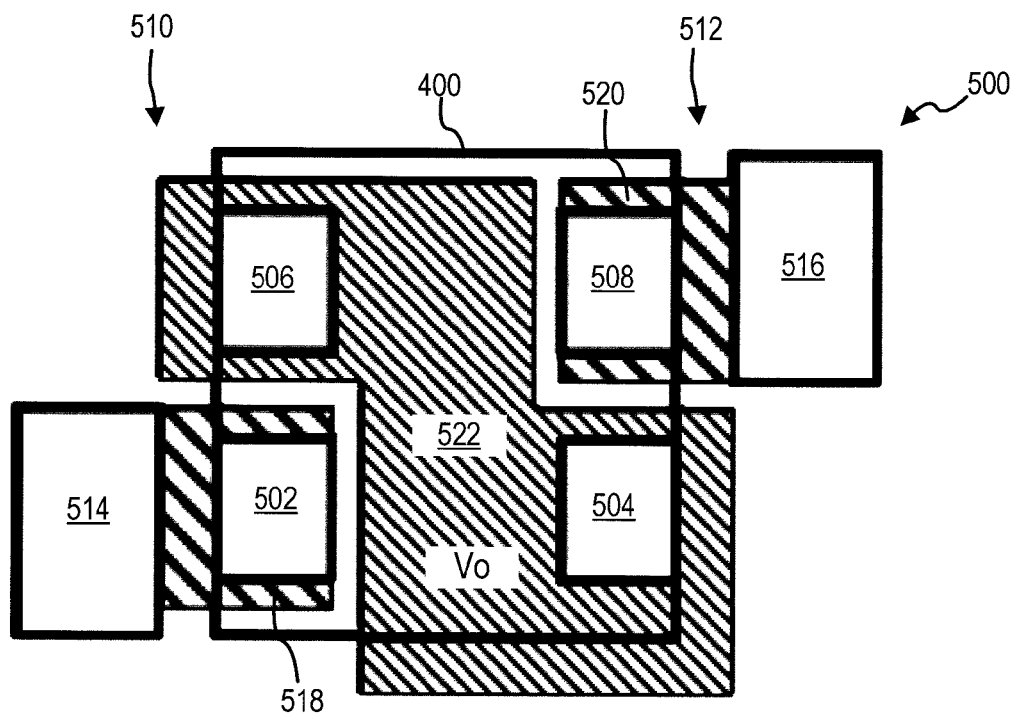
FIG. 5 shows a prior art PCB layout for use with the coupled inductor of FIG. 4 in a two-phase DC-to-DC converter application.
Figure 6:
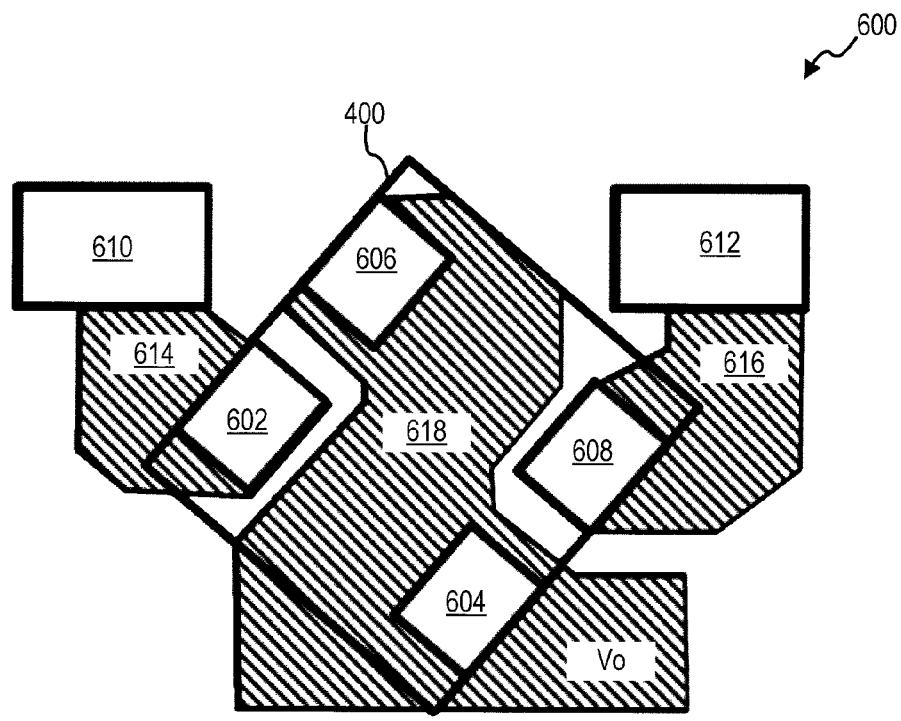
FIG. 6 shows another prior art PCB layout for use with the coupled inductor of FIG. 4 in a two-phase DC-to-DC converter application.

Thus, in contrast with many prior coupled inductors, such as coupled inductors 200 and 400 of FIGS. 2 and 4 respectively, coupled inductor 700's structure not only promotes low cost, ease of manufacturing, and low winding resistance; but coupled inductor 700's structure also allows its use in a DC-to-DC converter where all switching power stages are disposed in a row on a single side of the coupled inductor, as shown in the example of FIG. 11. Furthermore, coupled inductor 700's structure may also allow for its use in a DC-to-DC converter where inductor 700's common terminals are electrically coupled by a relatively short and wide PCB conductive trace, such as also shown in the example of FIG. 11. It should be appreciated that although coupled inductor 700 is discussed with respect to layout 1100, coupled inductor 700 is not limited to such layout. For example, coupled inductor could alternately be configured such that solder tabs 716 and 720 are connected to a common node, and solder tabs 718 and 722 are connected to respective switching nodes.

Figure 12:
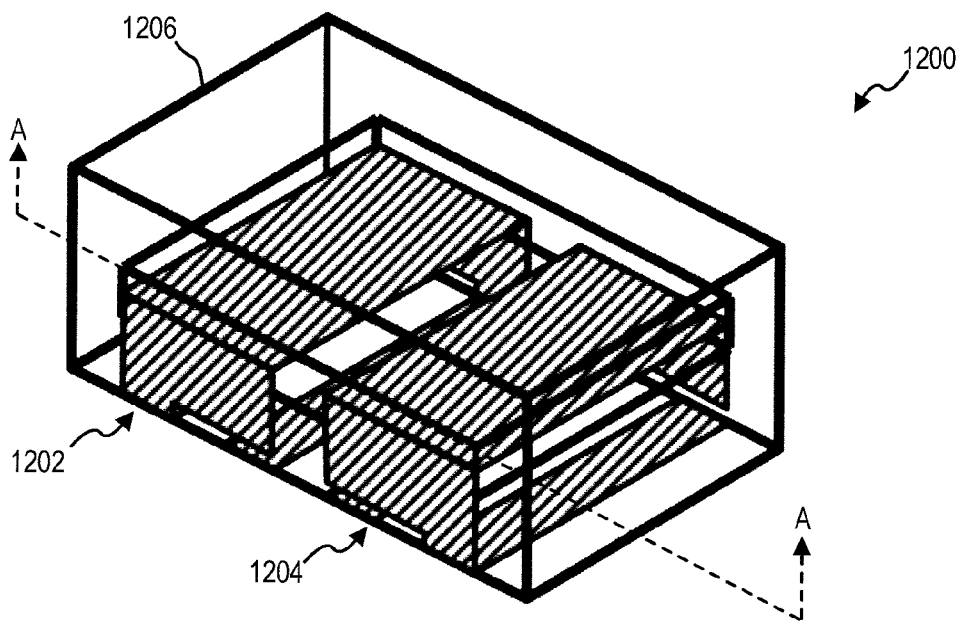
FIG. 12 shows a perspective view and FIG. 13 shows a top cross sectional view of another two-phase coupled inductor, according to an embodiment.
Figure 13:
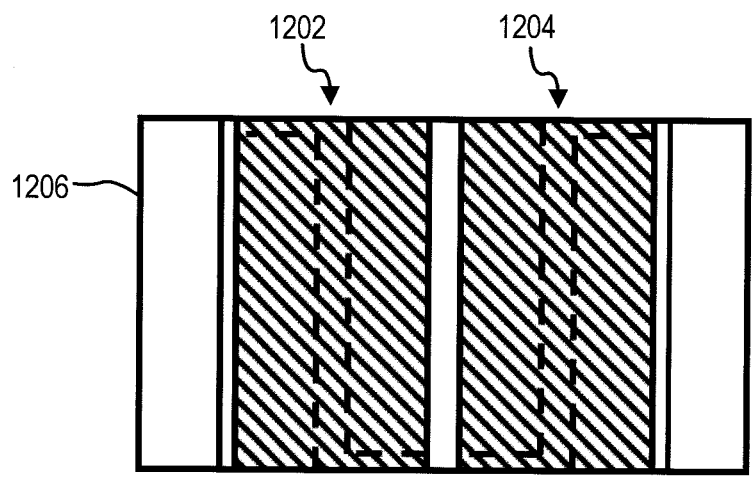
Figure 14:
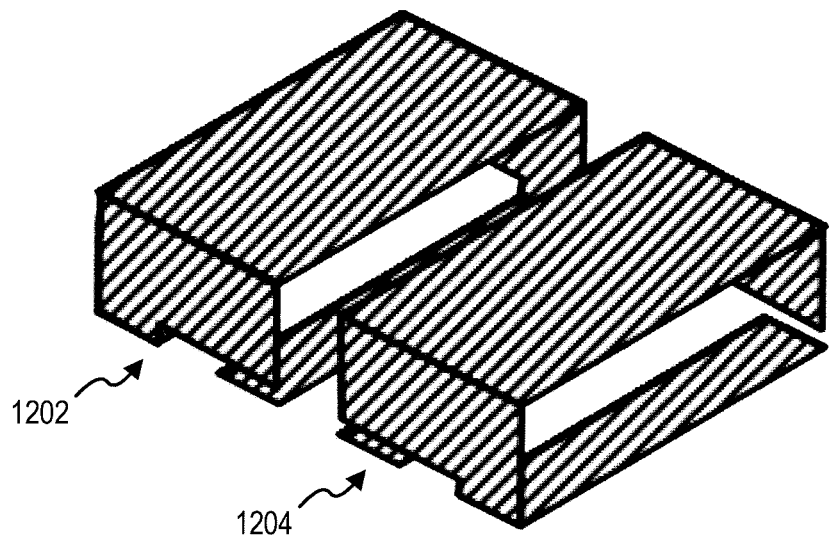
FIG. 14 shows a perspective view of the windings of the coupled inductor of FIGS. 12 and 13 removed from a magnetic core of the coupled inductor.

FIGS. 12 and 13 show a variation of coupled inductor 700 having wide windings to promote low winding impedance. Specifically, FIG. 12 shows a perspective view, and FIG. 13 shows a top cross-sectional view taken along line A-A of FIG. 12, of one two-phase coupled inductor 1200, which is similar to coupled inductor 700, but includes wide windings 1202, 1204. The outline of solder tabs of windings 1202, 1204 are shown by dashed lines in FIG. 13 where obscured by a magnetic core 1206, which is shown as transparent in FIG. 12. FIG. 14 shows a perspective view of windings 1202, 1204 removed from core 1206. Certain embodiments of coupled inductor 1200 may be used with PCB layout 1100 of FIG. 11.

Figure 15:
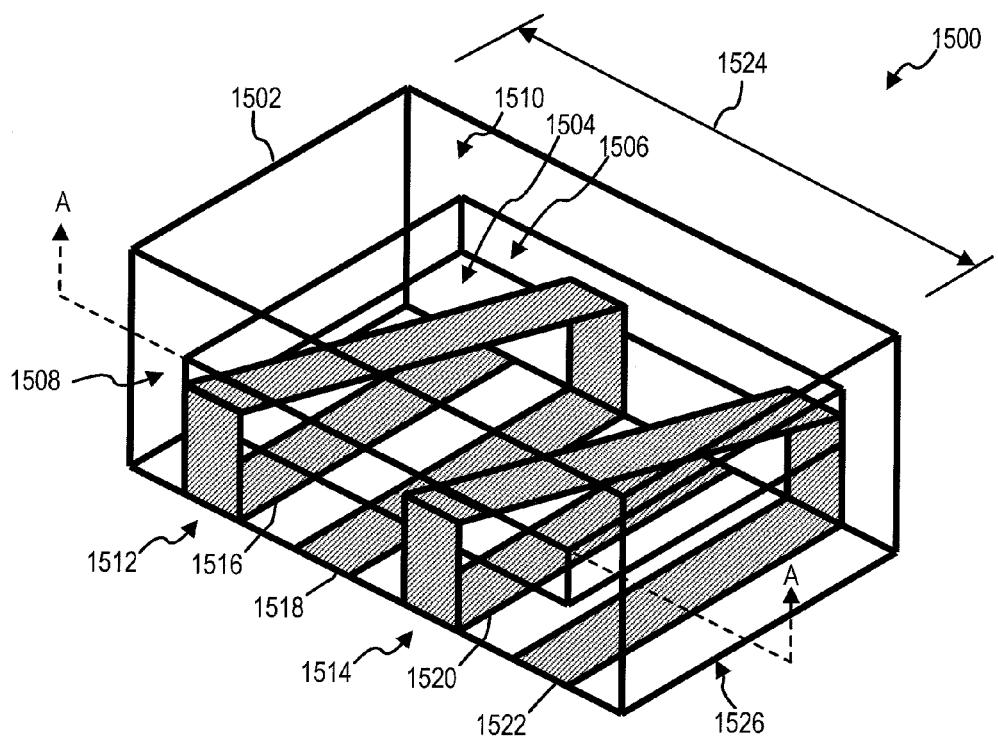
FIG. 15 shows a perspective view.
Figure 16:
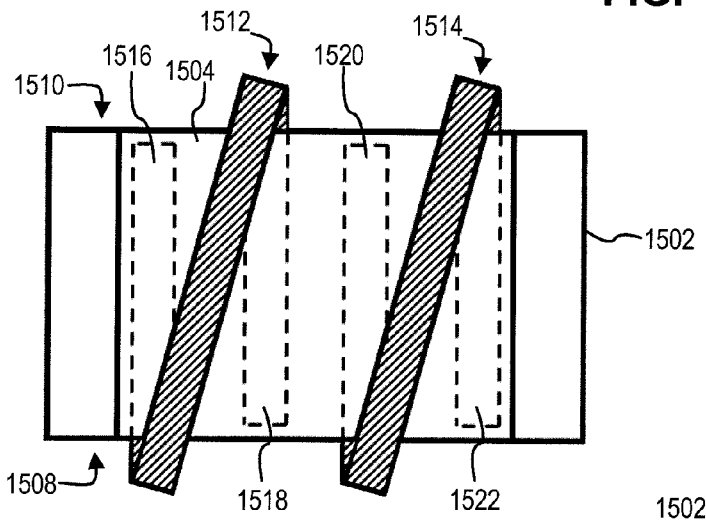
FIG. 16 shows a top cross sectional view.
Figure 17:
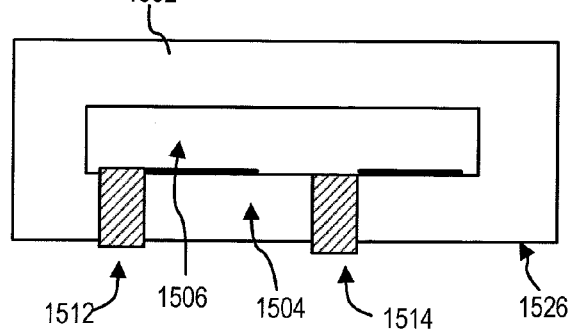
FIG. 17 shows a side view of another two-phase coupled inductor, according to an embodiment.

FIG. 15 shows a perspective view of one two-phase coupled inductor 1500, which is similar to coupled inductor 700, but with a different winding configuration that allows for a different PCB layout than coupled inductor 700. Coupled inductor 1500 includes a magnetic core 1502, shown as transparent in FIG. 15. Magnetic core 1502 includes a leg 1504 and forms a passageway 1506 from a first side 1508 to a second side 1510 of core 1502. Leg 1504 partially defines passageway 1506. FIG. 16 shows a top cross-sectional view of coupled inductor 1500 taken along line A-A of FIG. 15, and FIG. 17 shows a view of side 1508 of coupled inductor 1500.

Figure 18:
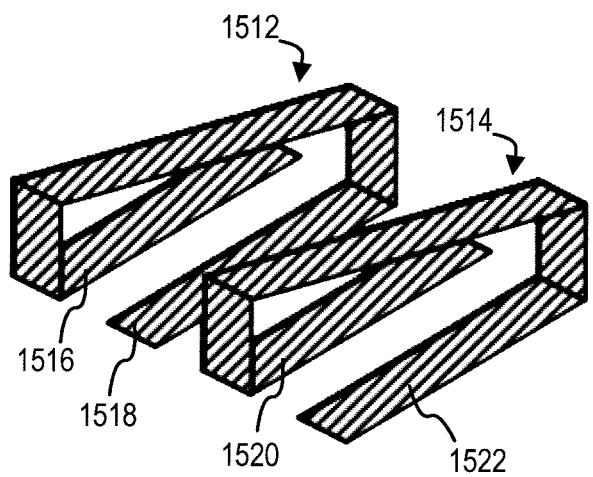
FIG. 18 shows a perspective view of the windings of the coupled inductor of FIGS. 15-17 removed from a magnetic core of the coupled inductor.

Coupled inductor 1500 further includes staple style windings 1512, 1514 wound at least partially around leg 1504 and through passageway 1506. A first end of winding 1512 extends from first side 1508 of core 1502 and forms a first solder tab 1516, and a second end of winding 1512 extends from second side 1510 of core 1502 and forms a second solder tab 1518. A first end of winding 1514 extends from first side 1508 of core 1502 and forms a third solder tab 1520, and a second end of winding 1514 extends from second side 1510 of core 1502 and forms a fourth solder tab 1522. Each of solder tabs 1516, 1518, 1520, and 1522 are separated from each other along a width 1524 of core 1502. In certain embodiments, solder tabs 1516, 1518, 1520, and 1522 are laterally adjacent and are at least partially formed along a bottom surface 1526 of core 1502, as shown. The outline of solder tabs 1516, 1518, 1520, 1522 are shown by dashed lines in FIG. 16 where obscured by core 1502. FIG. 18 shows a perspective view of windings 1512, 1514 removed from core 1502.

Coupled inductor 1500 is configured such that an electric current flowing through winding 1512 from first solder tab 1516 to second solder tab 1518 induces an electric current in winding 1514 flowing from fourth solder tab 1522 to third solder tab 1520. Conversely, an electric current flowing in winding 1514 from fourth solder tab 1522 to third solder tab 1520 induces an electric current in winding 1512 flowing from first solder tab 1516 to second solder tab 1518. Such configuration advantageously may allow coupled inductor 1500 to be used in a DC-to-DC converter where all of the switching power stages are disposed on a common side of inductor 1500, and adjacent solder tabs 1518 and 1520 are connected by a common PCB conductive trace.

Figure 19:
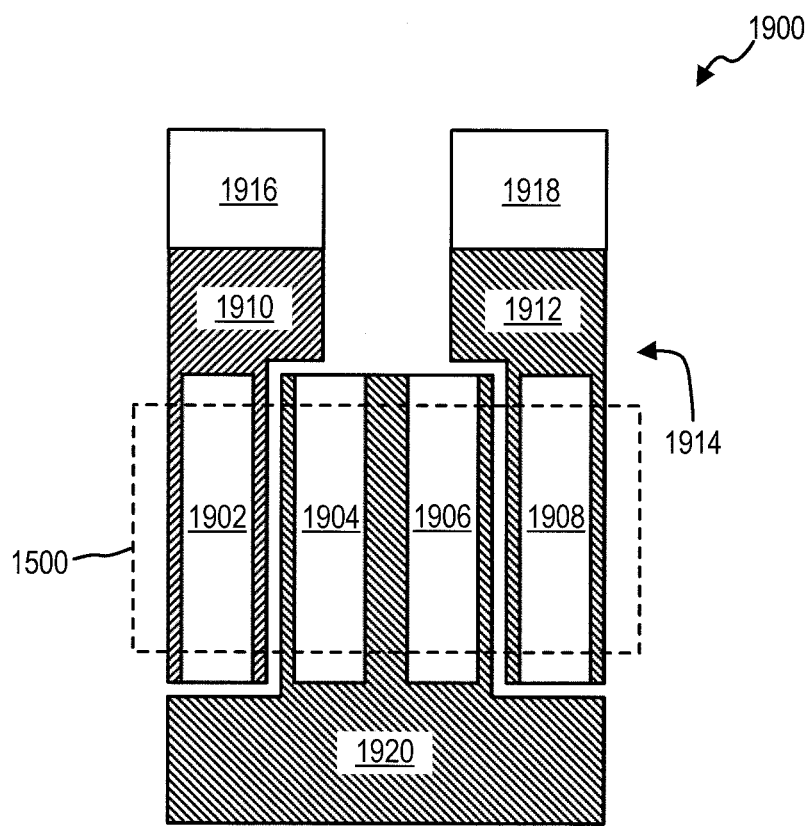
FIG. 19 shows one PCB layout that may be used with certain embodiments of the coupled inductor of FIGS. 15-17.

For example, FIG. 19 shows one PCB layout 1900, which is one possible PCB layout that may be used with certain embodiments of coupled inductor 1500 in a two-phase DC-to-DC converter application. Only the outline of coupled inductor 1500 is shown in FIG. 19 to show the pads of layout 1900. Layout 1900 includes pads 1902, 1904, 1906, 1908 for respectively connecting to solder tabs 1516, 1518, 1520, 1522 of coupled inductor 1500. A PCB conductive trace 1910, which forms part of a switching node, electrically couples pad 1902 to a switching circuit 1916, and a PCB conductive trace 1912, which forms part of another switching node, electrically couples pad 1908 to a switching circuit 1918. Switching node traces 1910, 1912 extend from a common side 1914 of coupled inductor 1500, thereby allowing placement of both switching power stages 1916, 1918 on the same side of coupled inductor 1500, as shown in FIG. 19. Additionally, PCB conductive trace 1920, which forms part of a common node and electrically couples together pads 1904, 1906, is short and wide, and has simple, substantially rectangular shape. In contrast to layout 1100 of FIG. 11, both common node pads 1904, 1906 are immediately adjacent in layout 1900, thereby simplifying layout 1900. Accordingly, coupled inductor 1500 may be preferred to coupled inductor 700 in applications where backwards compatibility with layouts for coupled inductor 200 is not required.

Layout 1900 is part of, for example, a buck DC-to-DC converter where switching circuits 1916, 1918 respectively switch solder tabs 1516, 1522 between an input voltage and ground, and conductive trace 1920 electrically couples to an output node. As another example, layout 1900 could be part of a boost DC-to-DC converter where switching circuits 1916, 1918 respectively switch solder tabs 1516, 1522 between an output voltage and ground, and conductive trace 1920 electrically couples to an input voltage node.

Figure 20:
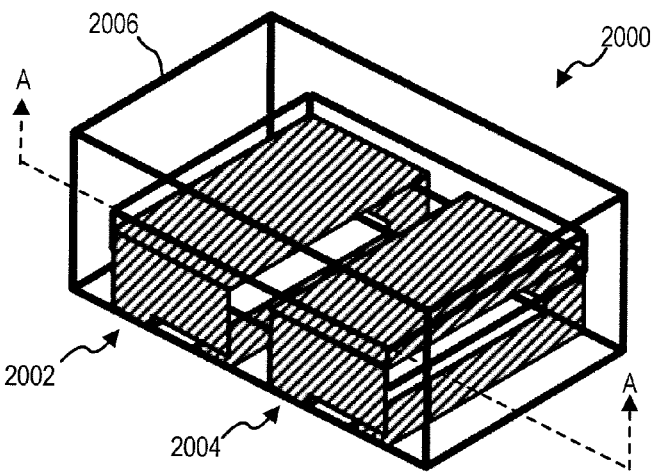
FIG. 20 shows a perspective view and FIG. 21 shows a top cross sectional view of yet another two-phase coupled inductor, according to an embodiment.
Figure 21:
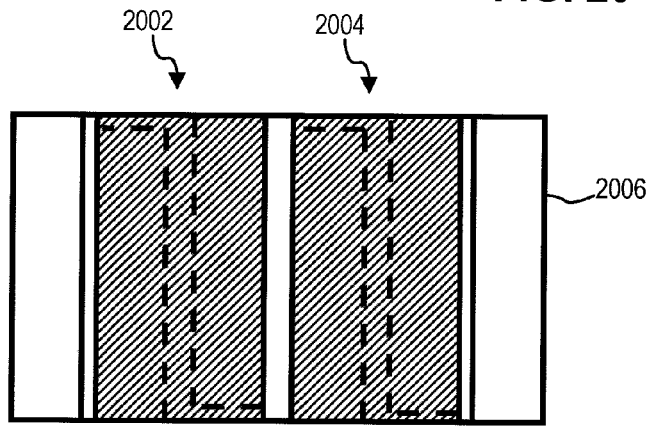
Figure 22:
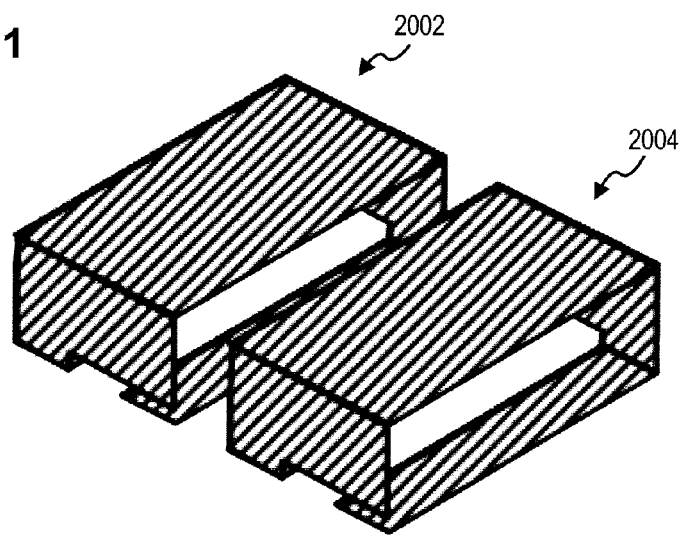
FIG. 22 shows a perspective view of the windings of the coupled inductor of FIGS. 20 and 21 removed from a magnetic core of the coupled inductor.

FIGS. 20 and 21 show a variation of coupled inductor 1500 having wide windings to promote low winding impedance. Specifically, FIG. 20 shows a perspective view, and FIG. 21 shows a top sectional view taken along line A-A for FIG. 20, of one two-phase coupled inductor 2000, which is similar to coupled inductor 1500, but includes wide windings 2002, 2004. The outline of solder tabs of windings 2002, 2004 are shown by dashed lines in FIG. 21 where obscured by a magnetic core 2006, which is shown as transparent in FIG. 20. FIG. 22 shows a perspective view of windings 2002, 2004 removed from magnetic core 2006. Certain embodiments of coupled inductor 2000 may be used with PCB layout 1900 of FIG. 19.

Figure 23:
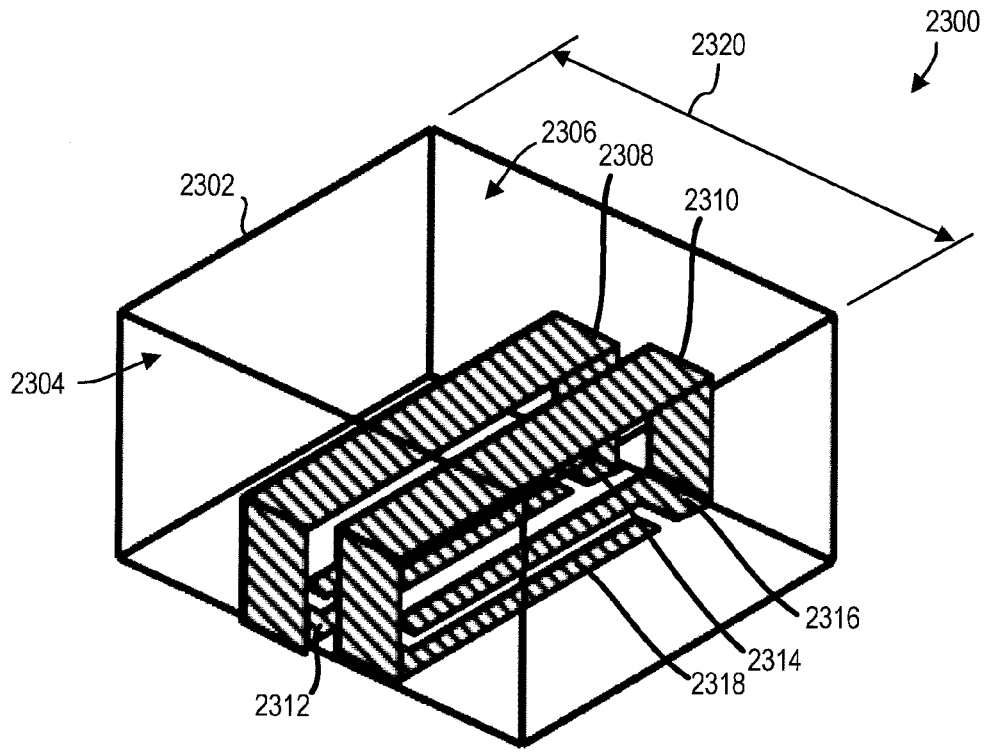
FIG. 23 shows a perspective view of another two-phase coupled inductor, according to an embodiment.
Figure 24:
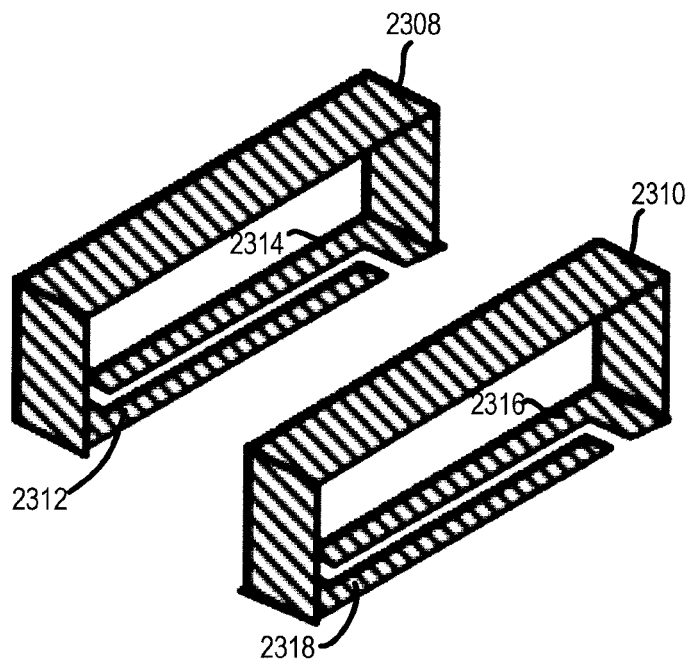
FIG. 24 shows a perspective view of the windings of the coupled inductor of FIG. 23 removed from the magnetic core of the coupled inductor.

FIG. 23 shows a perspective view of another two-phase coupled inductor 2300 including a magnetic core 2302 (shown as transparent in FIG. 23) which forms a passageway (not shown) from a first side 2304 to a second side 2306 of core 2302. Coupled inductor 2300 further includes staple style windings 2308, 2310 wound a least partially around a leg (not shown) extending from first side 2304 to second side 2306 of core 2302. A first end of winding 2308 extends from first side 2304 of core 2302 and forms a first solder tab 2312, and a second end of winding 2308 extends from second side 2306 of core 2302 and forms a second solder tab 2314. A first end of winding 2310 extends from second side 2306 of core 2302 and forms a third solder tab 2316, and a second end of winding 2310 extends from first side 2304 of core 2302 and forms a fourth solder tab 2318. Each of solder tabs 2312, 2314, 2316, and 2318 are separated from each other along a width 2320 of core 2302. FIG. 24 shows a perspective view of windings 2308, 2310 removed from core 2302.

Coupled inductor 2300 is configured such that an electric current flowing through winding 2308 from first solder tab 2312 to second solder tab 2314 induces an electric current flowing in winding 2310 from third solder tab 2316 to fourth solder tab 2318. Such configuration allow, for example, coupled inductor 2300 to be used in a DC-to-DC converter where all of the power stages are disposed on a common side of inductor 2300.

Figure 25:
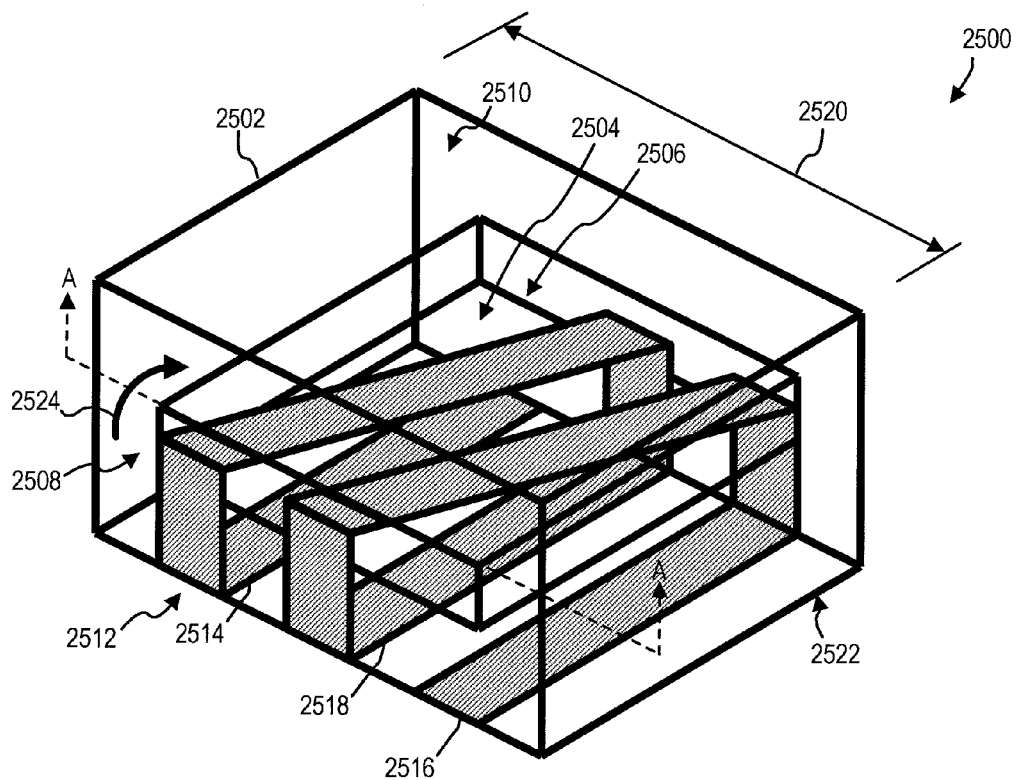
FIG. 25 shows a perspective view.

FIG. 25 shows a perspective view of one two-phase coupled inductor 2500. As discussed below, although coupled inductor 2500 need only include a single winding, thereby promoting ease of manufacturing and low cost, coupled inductor 2500 can nevertheless be used such that it includes two effectively separate windings.

Figure 26:
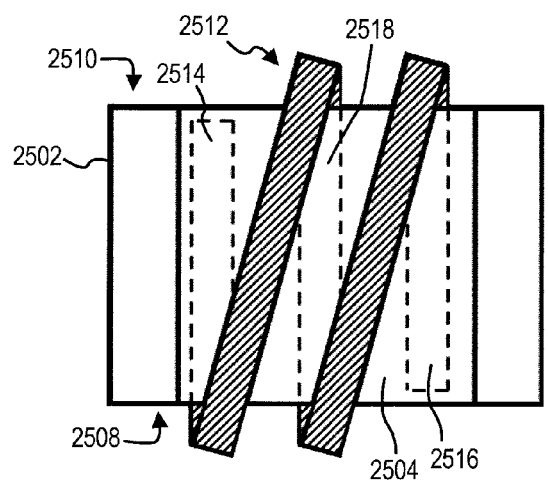
FIG. 26 shows a top cross sectional view.
Figure 27:
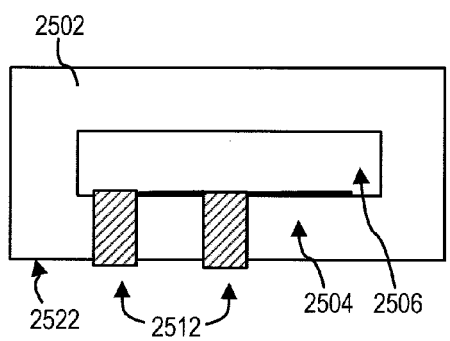
FIG. 27 shows a side view of another two-phase coupled inductor, according to an embodiment.

Coupled inductor 2500 includes a magnetic core 2502, shown as transparent in FIG. 25. Magnetic core 2502 includes a leg 2504 and forms a passageway 2506 from a first side 2508 to a second side 2510 of core 2502. Leg 2504 partially defines passageway 2506. FIG. 26 shows a top cross-sectional view of coupled inductor 2500 taken along line A-A of FIG. 25, and FIG. 27 shows first side 2508 of coupled inductor 2500.

Figure 28:
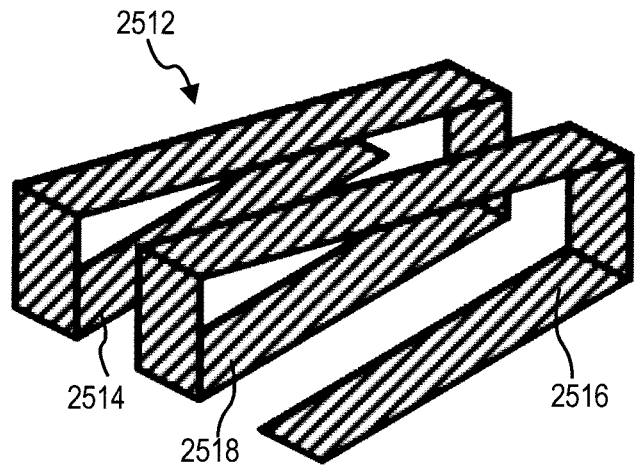
FIG. 28 shows a perspective view of the winding of the coupled inductor of FIGS. 25-27 removed from a magnetic core of the coupled inductor.

Coupled inductor 2500 further includes a staple style winding 2512, which is, for example, a foil winding to minimize the skin effect and thereby promote low AC resistance. Winding 2512 is wound at least partially around leg 2504 and through passageway 2506 of core 2502. A first end of winding 2512 extends from first side 2508 of core 2502 and forms a first solder tab 2514, and a second end of winding 2512 extends from second side 2510 of core 2502 and forms a second solder tab 2516. An intermediate or center-tapped portion of winding 2512 forms a third solder tab 2518. Thus, single winding 2512 can be utilized in coupled inductor 2500 as two effectively separate windings—a first effective winding between first solder tab 2514 and third solder tab 2518, and a second effective winding between second solder tab 2516 and third solder tab 2518. Each of solder tabs 2514, 2516, 2518 are separated from each other along a width 2520 of core 2502, and in certain embodiments, solder tabs 2514, 2516, 2518 are laterally adjacent and are at least partially formed along a bottom surface 2522 of core 2502, as shown. Solder tabs 2514, 2516, and 2518 are shown by dashed lines in FIG. 26 where obscured by core 2502. FIG. 28 shows a perspective view of winding 2512 removed from core 2502.

Coupled inductor 2500 is configured such that an electric current flowing through winding 2512 from first solder tab 2514 to third solder tab 2518 induces an electric current flowing through winding 2512 from second solder tab 2516 to third solder tab 2518. Similarly, a magnetic current flowing through winding 2512 from second solder tab 2516 to third solder tab 2518 induces an electric current in winding 2512 flowing from first solder tab 2514 to third solder tab 2518. Such configuration, for example, may allow for coupled inductor 2500 to be used in DC-to-DC converter where all of the power stages are disposed on a common side of inductor 2500.

Figure 29:
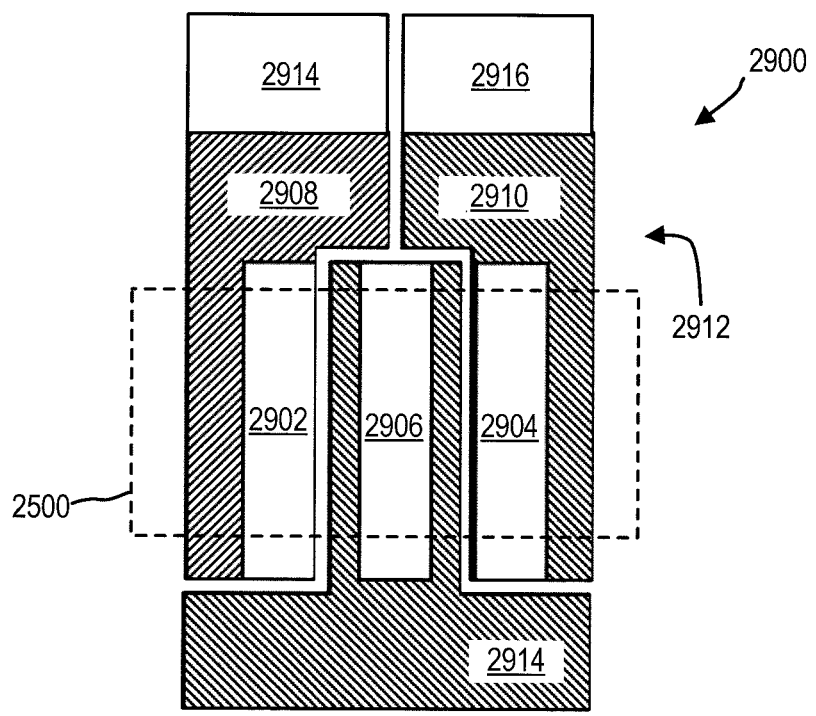
FIG. 29 shows one PCB layout that may be used with certain embodiments of the coupled inductor of FIGS. 25-27.

For example, FIG. 29 shows one PCB layout 2900, which is one possible layout that may be used with certain embodiments of coupled inductor 2500 in a two-phase DC-to-DC converter application, such as a buck converter or a boost converter. Only the outline of coupled inductor 2500 is shown in FIG. 29 to show the pads of layout 2900. Layout 2900 includes pads 2902, 2904, 2906 for respectively connecting to solder tabs 2514, 2516, 2518 of coupled inductor 2500. A PCB conductive trace 2908, which forms part of a switching node, electrically couples pad 2902 to a switching circuit 2914, and a PCB conductive trace 2910, which forms part of another switching node, electrically couples pad 2904 to a switching circuit 2916. Switching circuit traces 2908, 2910 extend from a common side 2912 of coupled inductor 2500, thereby allowing placement of both switching power stages 2914, 2916 on the same side of coupled inductor 2900, as shown in FIG. 29. Additionally, only a single pad 2906 connects to a common node, thereby reducing length of common node trace 2914 and simplifying layout.

Layout 2900 is part of, for example, a buck DC-to-DC converter where switching circuits 2914, 2916 respectively switch solder tabs 2514, 2516 between an input voltage and ground, and conductive trace 2914 electrically couples to an output node. As another example, layout 2900 could be part of a boost DC-to-DC converter where switching circuits 2914, 2916 respectively switch solder tabs 2514, 2516 between an output voltage and ground, and conductive trace 2914 electrically couples to an input voltage node.

Figure 30:
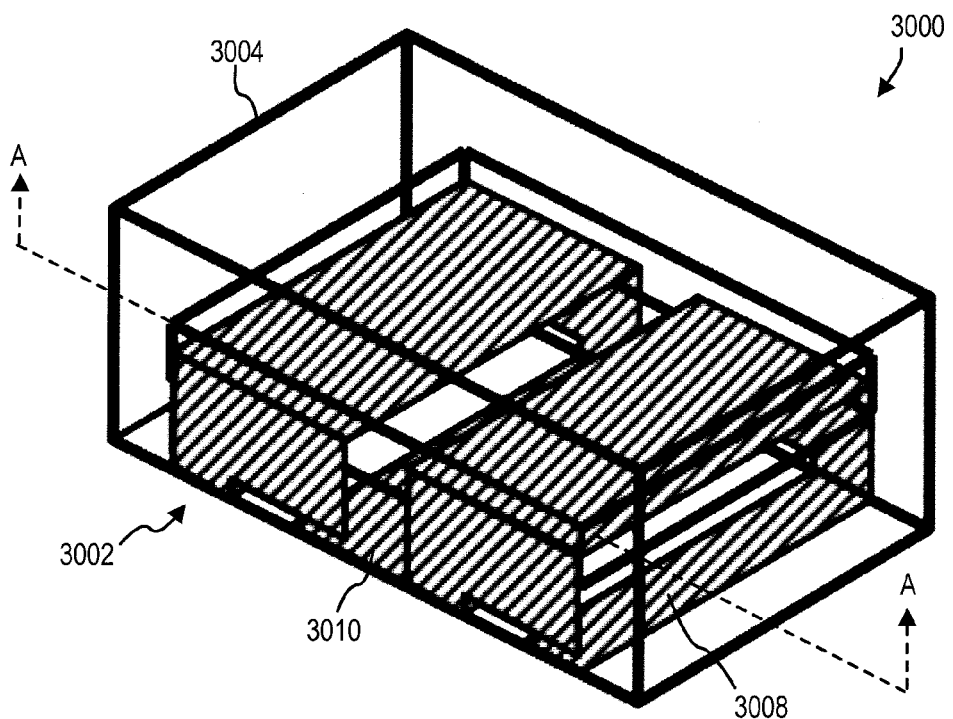
FIG. 30 shows a perspective view and FIG. 31 shows a top cross sectional view of another two-phase coupled inductor, according to an embodiment.
Figure 31:
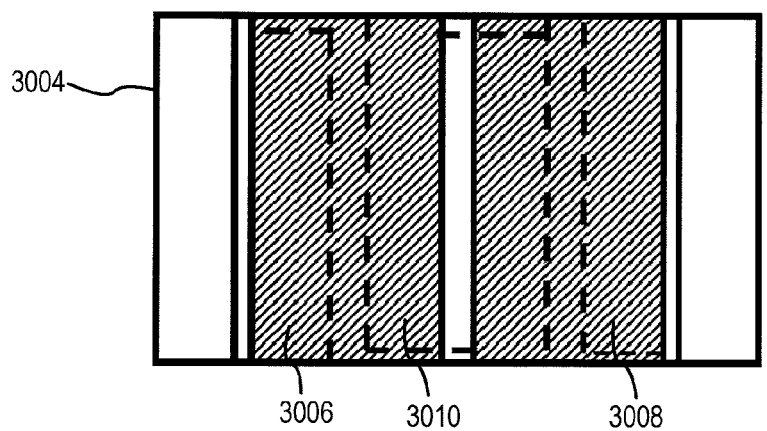
Figure 32:
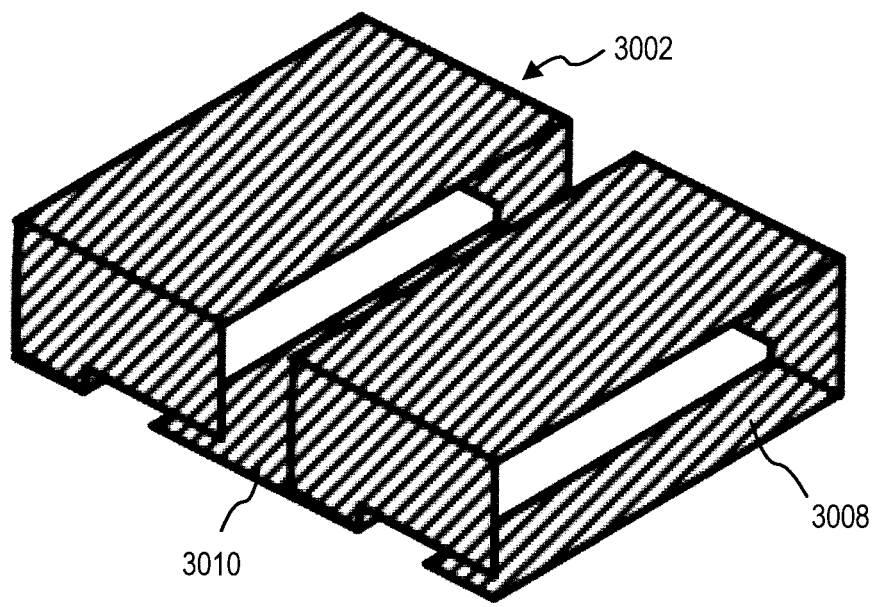
FIG. 32 shows a perspective view of the windings of the coupled inductor of FIGS. 30 and 31 removed from the magnetic core of the coupled inductor.
Figure 33:
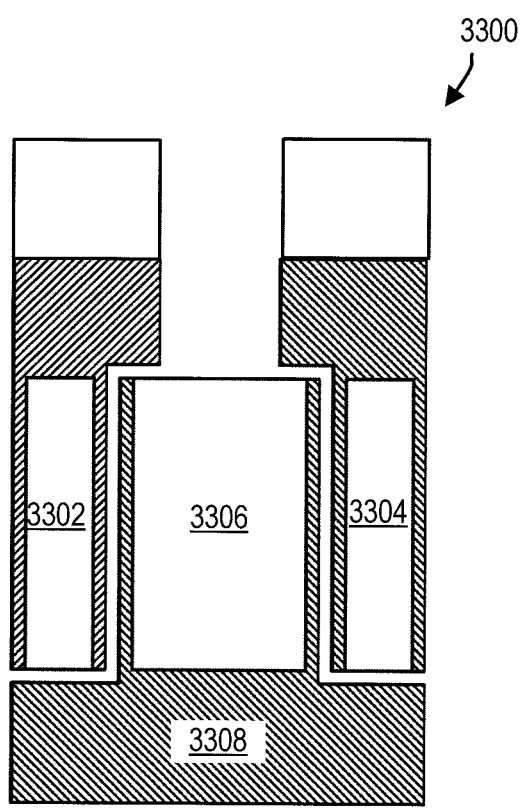
FIG. 33 shows one PCB layout that may be used with certain embodiments of the coupled inductor of FIGS. 30 and 31.

FIGS. 30 and 31 show a variation of coupled inductor 2500 including a wide winding to promote low winding impedance. Specifically, FIG. 30 shows a perspective view, FIG. 31 shows a cross sectional view taken along line A-A of FIG. 30, of one two-phase coupled inductor 3000, which is similar to coupled inductor 2500 but includes a wide winding 3002. FIG. 32 shows a perspective view of winding 3002 removed from a magnetic core 3004, which is shown as transparent in FIG. 30. FIG. 33 shows a PCB layout 3300, which is one possible PCB layout that may be used with certain embodiments of coupled inductor 3000 in a two-phase DC-to-DC converter application. Layout 3300 includes pads 3302, 3304, 3306 for respectively connecting to solder tabs 3006, 3008, 3010 (see FIG. 30 and FIG. 31 where outlines of solder tabs are shown with dashed lines where obscured by core 3004) of winding 3002. Layout 3300 is similar to layout 2900 of FIG. 29, but layout 3300 includes a wider conductive trace 3308 connecting to a common node, thereby promoting even lower impedance of the common node.

Figure 34:
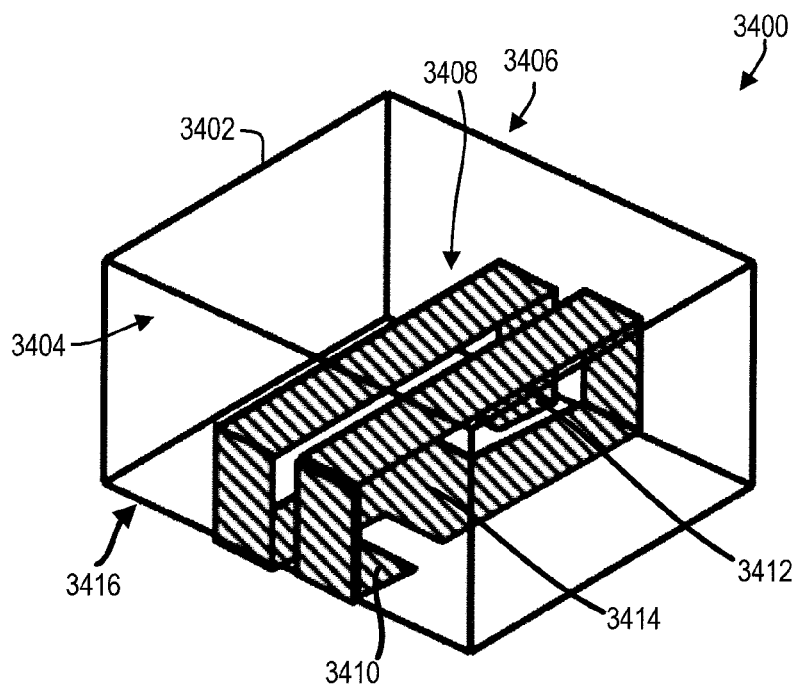
FIG. 34 shows a perspective view of another two-phase coupled inductor, according to an embodiment.
Figure 35:
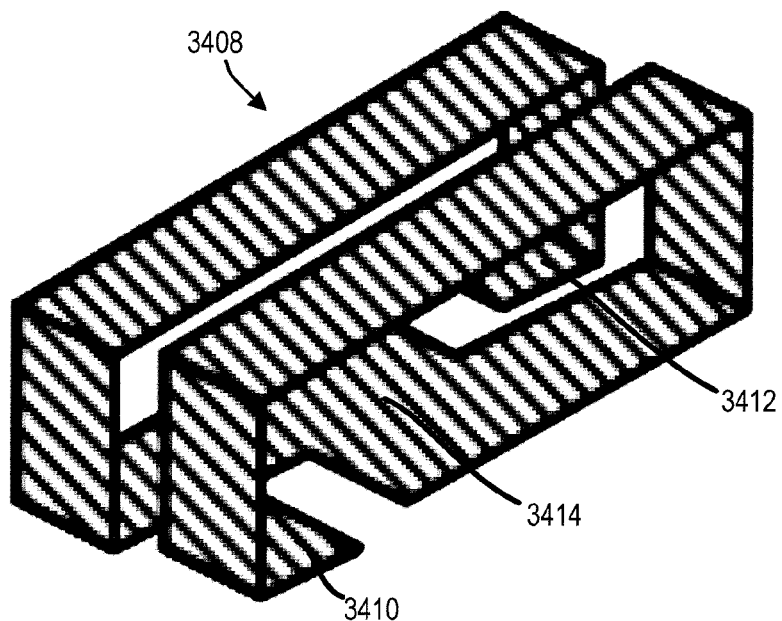
FIG. 35 shows a perspective view of the winding of the coupled inductor of FIG. 34 removed from a magnetic core of the coupled inductor.

FIG. 34 shows one two-phase coupled inductor 3400. Coupled inductor 3400 includes a magnetic core 3402 including a leg (not shown) and forming a passageway (not shown) from a first side 3404 to a second side 3406 of core 3402. Coupled inductor 3400 further includes a staple style winding 3408, which is, for example, a foil winding to minimize the skin effect and thereby promote low winding impedance. Winding 3408 is wound around the leg of core 3402 and through the passageway of core 3402. A first end of winding 3408 extends from first side 3404 of core 3402 and forms a first solder tab 3410, and a second end of winding 3408 extends from second side 3406 of core 3402 and forms a second solder tab 3412. An intermediate or center-tapped portion of winding 3408 forms a third solder tab 3414. In certain embodiments, solder tabs 3410, 3412, 3414 are at least partially formed along a bottom surface 3416 of core 3402, as shown. FIG. 35 shows a perspective view of winding 3408 removed from core 3402.

Coupled inductor 3400 is configured such that an electric current flowing through winding 3408 from first solder tab 3410 to third solder tab 3414 induces an electric current flowing through winding 3408 from second solder tab 3412 to third solder tab 3414. Similarly, an electric current flowing through winding 3408 from second solder tab 3412 to third solder tab 3414 induces a current in winding 3408 flowing from first solder tab 3410 to third solder tab 3414. Similar to coupled inductors 2500 and 3000 of FIGS. 25 and 30 respectively, although coupled inductor 3400 need only include a single winding, thereby promoting ease of manufacturing and low cost, coupled inductor 3400 can nevertheless be used such that it includes two effectively separate windings.

Figure 36:
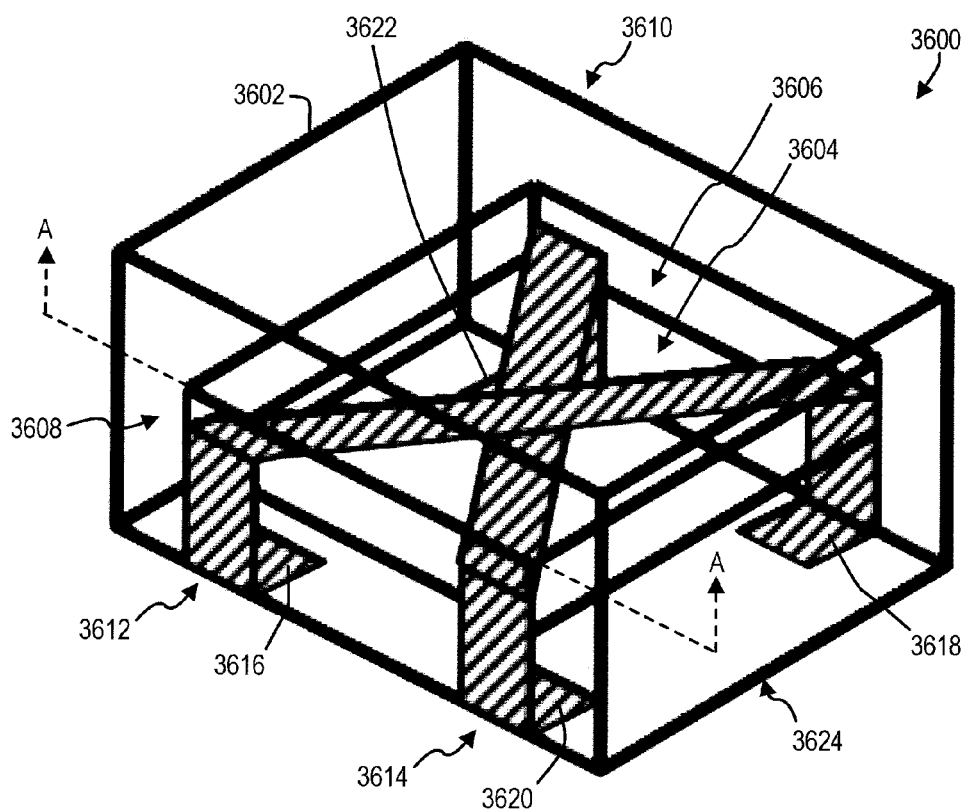
FIG. 36 shows a perspective view.
Figure 37:
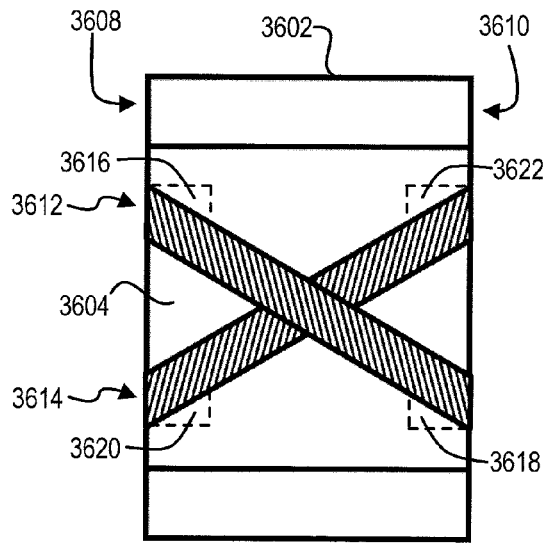
FIG. 37 shows a top cross sectional view, and 38 shows a side view of another two-phase coupled inductor, according to an embodiment.
Figure 38:
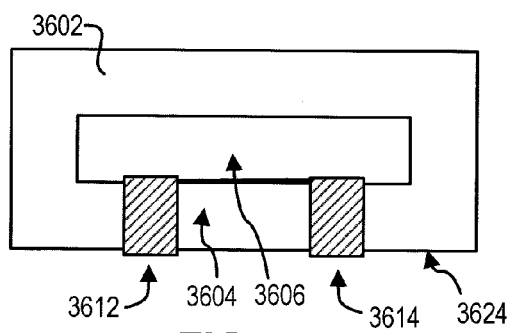

FIG. 36 shows a perspective view of one two-phase coupled inductor 3600. Coupled inductor 3600 includes a magnetic core 3602 including a leg 3604 and forming a passageway 3606 extending from a first side 3608 to a second side 3610 of core 3602. Leg 3604 partially defines passageway 3606. FIG. 37 shows a top cross-sectional view of coupled inductor 3600 taken along line A-A of FIG. 36, and FIG. 38 shows side 3608 of coupled inductor 3600.

Coupled inductor 3600 further includes staple style windings 3612, 3614 which are, for example, foil windings. Each winding 3612, 3614 is wound at least partially through passageway 3606. Windings 3612, 3614 also cross each other in passageway 3606, which advantageously enables coupled inductor 3600 to achieve inverse magnetic coupling in a DC-to-DC converter application where each power stage is disposed on a common side of the coupled inductor.

Figure 39:
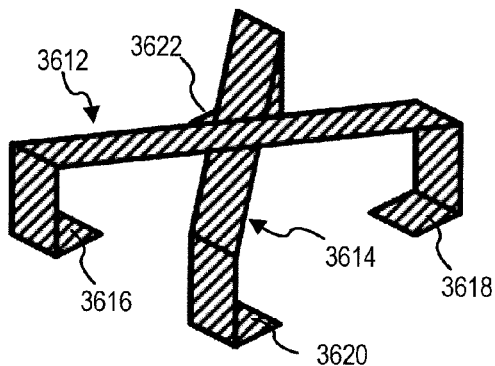
FIG. 39 shows a perspective view of the windings of the coupled inductor of FIGS. 36-38 removed from the magnetic core of the coupled inductor.

A first end of winding 3612 extends from first side 3608 of magnetic core 3602 and forms a first solder tab 3616, and a second end of winding 3612 extends from second side 3610 of core 3602 and forms a second solder tab 3618. A first end of winding 3614 extends from first side 3608 of magnetic core 3602 and forms a third solder tab 3620, and a second end of winding 3614 extends from second side 3610 of core 3602 and forms a fourth solder tab 3622. In certain embodiments, solder tabs 3616, 3618, 3620, 3622 are at least partially formed along a bottom surface 3624 of core 3602, as shown. The outlines of solder tabs 3616, 3618, 3620, 3622 are shown by dashed lines in FIG. 37 where obscured by core 3602. FIG. 39 shows a perspective view of windings 3612, 3614 and their relative positions but with magnetic core 3602 removed. Windings 3612 and 3614 are insulated at least where they cross in passageway 3606 by an insulator such as insulating tape or varnish.

The fact that windings 3612, 3614 cross in passageway 3606 results in windings 3612, 3614 being magnetically coupled such that a current flowing through winding 3612 from first solder tab 3616 to second solder tab 3618 induces an electric current in winding 3618 flowing from third solder tab 3620 to fourth solder tab 3622. Therefore, coupled inductor can be used, for example, in a DC-to-DC converter where solder tabs on one side of core 3602 are connecting to respective switching power stages and solder tabs on another side of the core 3602 are connected to a common node.

Figure 40:
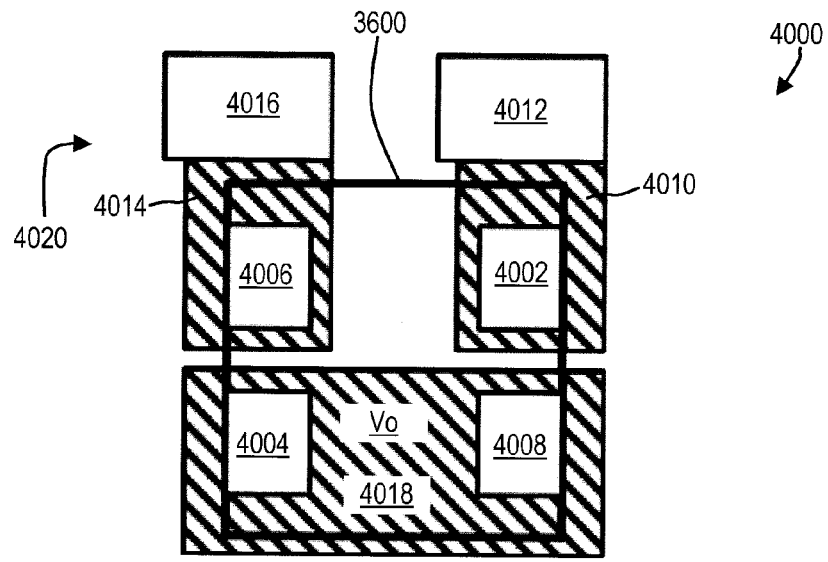
FIG. 40 shows one PCB layout that may be used with certain embodiments of the coupled inductor of FIGS. 36-38, according to an embodiment.

For example, FIG. 40 shows one PCB layout 4000, which is one possible layout that may be used with coupled inductor 3600 in a two-phase DC-to-DC converter, such as a buck converter or a boost converter. Layout 4000 includes pads 4002, 4004, 4006, 4008 for respectively coupling to solder tabs 3616, 3618, 3620, 3622 of coupled inductor 3600. Only the outline of coupled inductor 3600 is shown in FIG. 40 to show the pads of layout 4000. PCB conductive trace 4010, which forms part of a switching node, electrically couples pad 4002 to a switching circuit 4012. PCB conductive trace 4014, which forms part of another switching node, electrically couples pad 4006 to a switching circuit 4016. A PCB conductive trace 4018, which forms part of a common node, electrically couples pads 4004, 4008. Switching circuits 4012, 4016 are located on a common side 4020 in layout 4000. Additionally, conductive trace 4018 is short, wide, and has a simple rectangular shape, thereby promoting low impedance of trace 4018 and its manufacturability.

Layout 4000 is part of, for example, a buck DC-to-DC converter where switching circuits 4012, 4016 respectively switch solder tabs 3616, 3620 between an input voltage and ground, and conductive trace 4018 electrically couples to an output node. As another example, layout 1900 could be part of a boost DC-to-DC converter where switching circuits 4012, 4016 respectively switch solder tabs 3616, 3620 between an output voltage and ground, and conductive trace 4018 electrically couples to an input voltage node.

Figure 41:
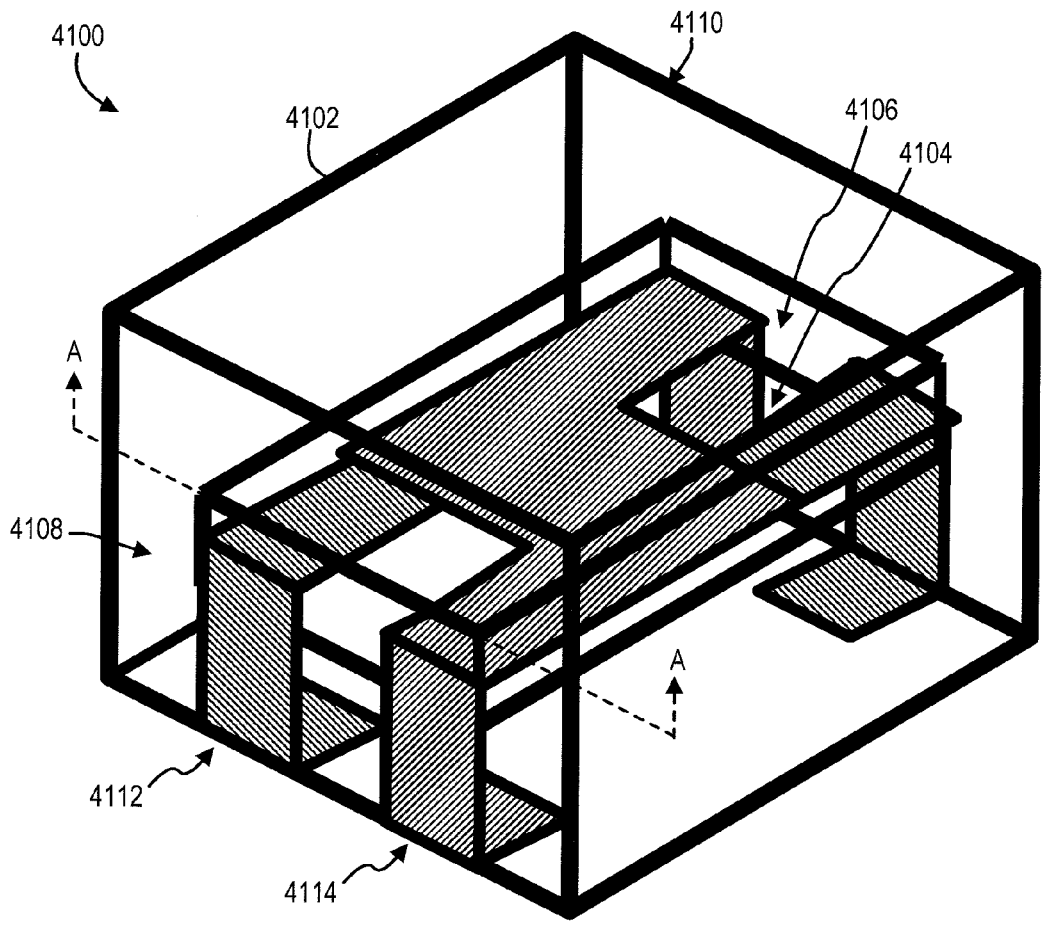
FIG. 41 shows a perspective view and FIG. 42 shows a top cross sectional view of another two-phase coupled inductor, according to an embodiment.
Figure 42:
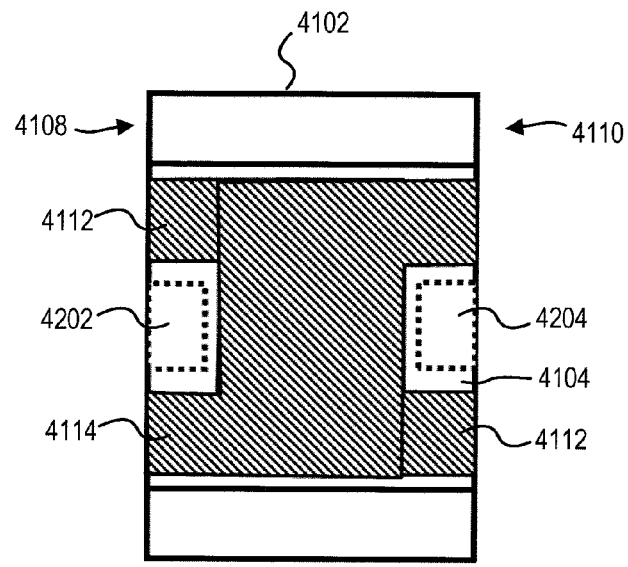

FIGS. 41 and 42 show a variation of coupled inductor 3600 including wide windings to promote low winding impedance. Specifically, FIG. 41 shows a perspective view, and FIG. 42 shows a top cross-sectional view taken along line A-A of FIG. 41, of one two-phase coupled inductor 4100, which is similar to coupled inductor 3600, but has a different winding configuration. In particular, coupled inductor 4100 includes a magnetic core 4102 (shown as transparent in FIG. 41) including a leg 4104 and forming a passageway 4106 extending from a first side 4108 to a second side 4110 of core 4102. Leg 4104 partially defines passageway 4106. Coupled inductor 4100 further includes staple style windings 4112, 4114 that are, for example, foil windings. Each winding 4112, 4114 is wound at least partially through passageway 4106, and windings 4112, 4114 cross in passageway 4106. Windings 4112, 4114 are insulated at least where they cross in passageway 4106. One or more of areas 4202, 4204 (see FIG. 42) between windings 4112, 4114 in passageway 4106 are partially or fully filled with magnetic material to increase leakage inductance values of windings 4112, 4114 when used in a circuit, such as a DC-to-DC converter. As known in the art, coupled inductor leakage inductance values must be sufficiently large in multi-phase DC-to-DC converter applications to limit ripple current magnitude.

Figure 43:
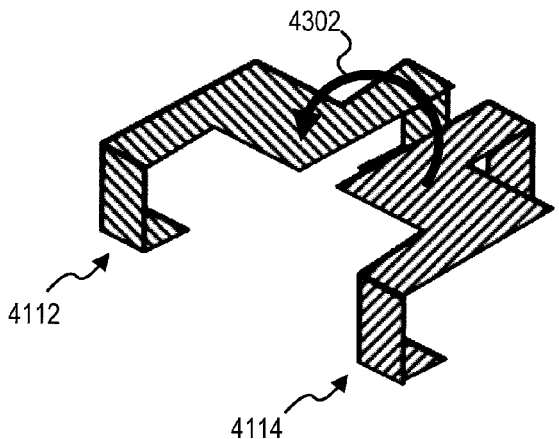
FIGS. 43 and 44 show perspective views of the windings of the coupled inductor of FIGS. 41 and 42 removed from the magnetic core of the coupled inductor.
Figure 44:
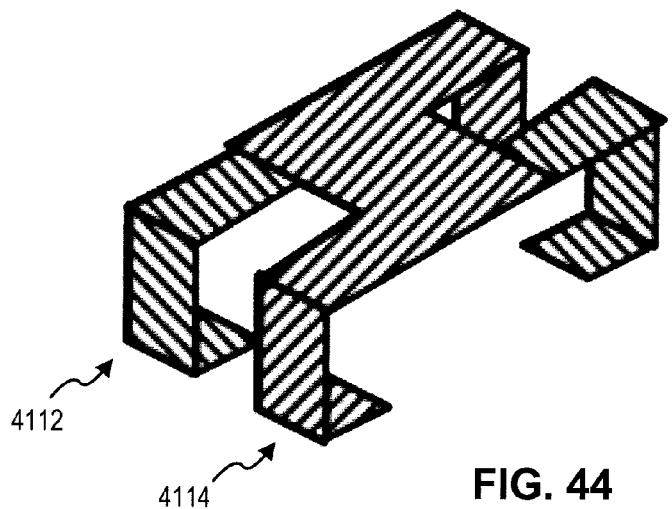

FIG. 43 shows a perspective view of windings 4112, 4114 separated from each other and separated from core 4102. Windings 4112, 4114 are stacked, however, when installed in inductor 4100, such as suggested by arrow 4302. FIG. 44 shows a perspective view of windings 4112, 4114 when stacked but separated from 4102. Although winding 4114 is shown stacked on top of winding 4112, the order of stacking could be changed such that winding 4112 is stacked on winding 4114. Certain embodiments of coupled inductor 4100 may be used with PCB layout 4000 of FIG. 40.

Figure 45:
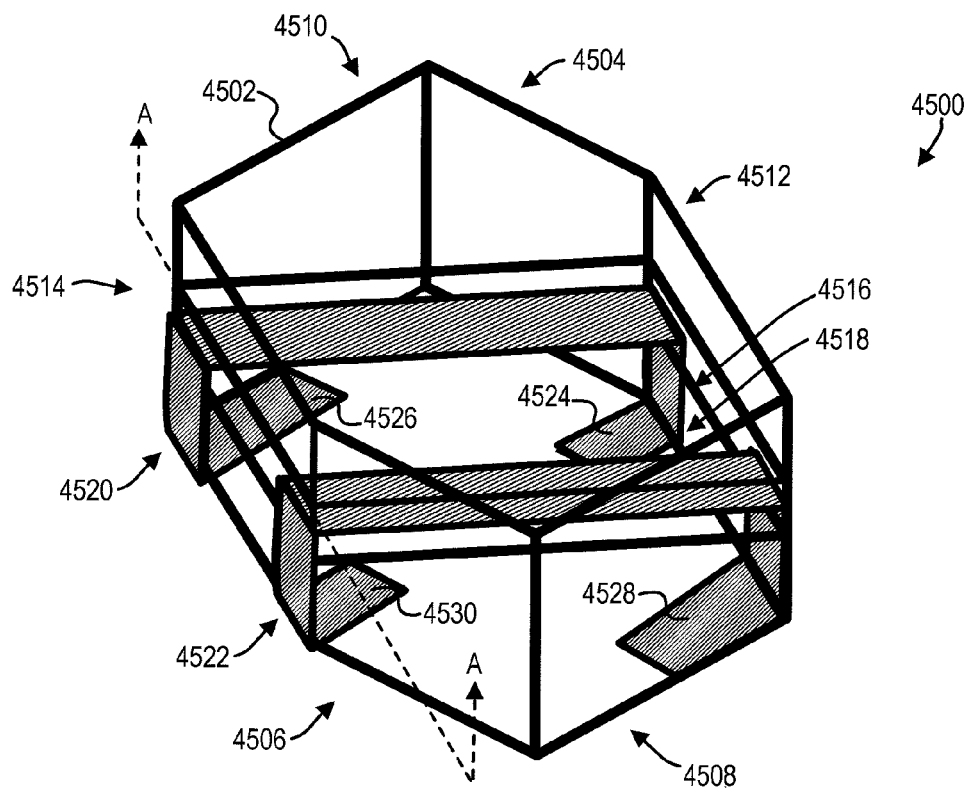
FIG. 45 shows a perspective view and FIG. 46 shows a top view of another two-phase coupled inductor, according to an embodiment.
Figure 46:
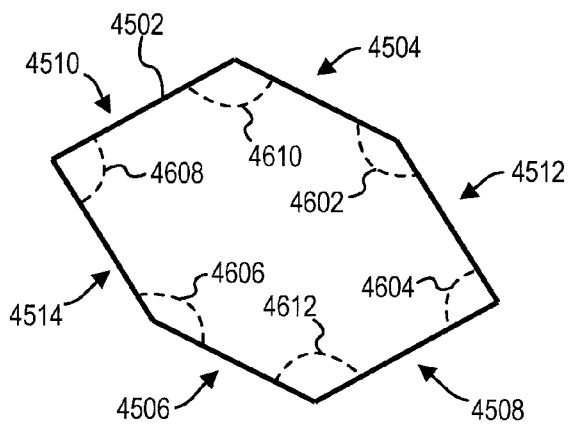
Figure 47:
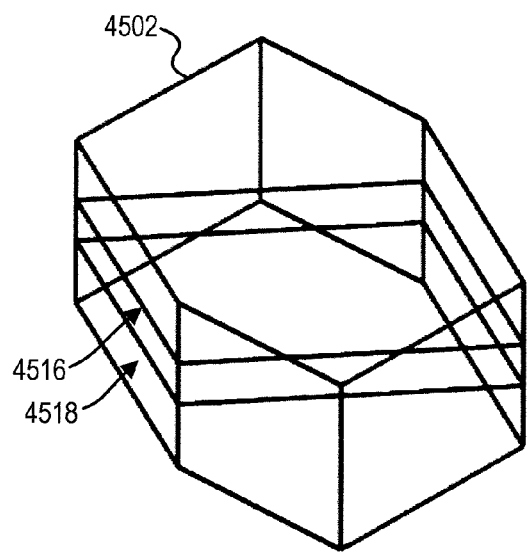
FIG. 47 shows a perspective view of the magnetic core of the coupled of FIGS. 45-46 without the windings of the coupled inductor.

FIG. 45 shows a perspective view and FIG. 46 shows a top view of one two-phase coupled inductor 4500. Coupled inductor 4500 includes a magnetic core 4502, shown as transparent in FIG. 45, including a first side 4504 opposite a second side 4506, a third side 4508 opposite a fourth side 4510, and a fifth side 4512 opposite a sixth side 4514. FIG. 47 shows a transparent perspective view of core 4502 without windings. Fifth side 4512 connects first side 4504 to the third side 4508 and forms an obtuse angle 4602 with the first side 4504. Fifth side 4512 also forms an obtuse angle 4604 with the third side 4508. Sixth side 4514 connects second side 4506 to fourth side 4510 and forms an obtuse angle 4606 with second side 4506. Sixth side 4514 also forms an obtuse angle 4608 with fourth side 4510. First side 4504 joins fourth side 4510 at an obtuse angle 4610, and second side 4506 joins third side 4508 at an obtuse angle 4612. Magnetic core 4502 forms a passageway 4516 extending through core 4502 from fifth side 4512 to sixth side 4514, and passageway 4516 is partially defined by a leg 4518 of magnetic core 4502.

Coupled inductor 4500 further includes windings 4520, 4522, which are wound through passageway 4516 and at least partially around leg 4518. A first end of winding 4520 extends from fifth side 4512 of core 4502 and forms a first solder tab 4524, and a second end of winding 4520 extends from sixth side 4514 of core 4502 and forms a second solder tab 4526. A first end of winding 4522 extends from fifth side 4512 of core 4502 and forms a third solder tab 4528, and a second end of winding 4522 extends from sixth side 4514 of core 4502 and forms a fourth solder tab 4530. Coupled inductor 4500 is configured such that a current flowing through winding 4520 from second solder tab 4526 to first solder tab 4524 induces an electric current flowing through winding 4522 from third solder tab 4528 to fourth solder tab 4530. Similarly, an electric current flowing through winding 4522 from third solder tab 4528 to fourth solder tab 4530 induces an electric current flowing through winding 4520 from second solder tab 4526 to first solder tab 4524.

Figure 48:
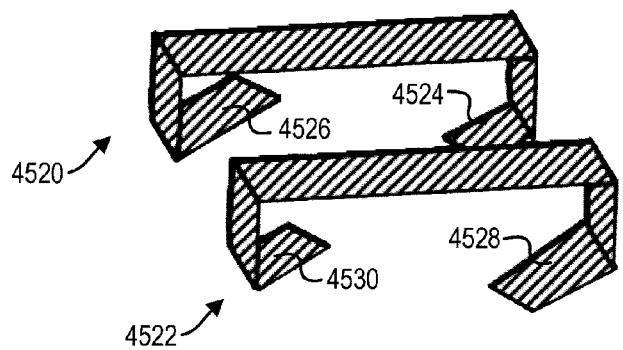
FIG. 48 shows a perspective view of the windings of the coupled inductor of FIGS. 45-46 removed from the magnetic core of the coupled inductor.

FIG. 48 shows a perspective view of windings 4520, 4522 separate from core 4502. Some or all of passageway 4516 between windings 4520, 4522 is optionally partially or completely filled with magnetic material to increase leakage inductance values of windings 4520, 4522 when used in a circuit.

Figure 49:
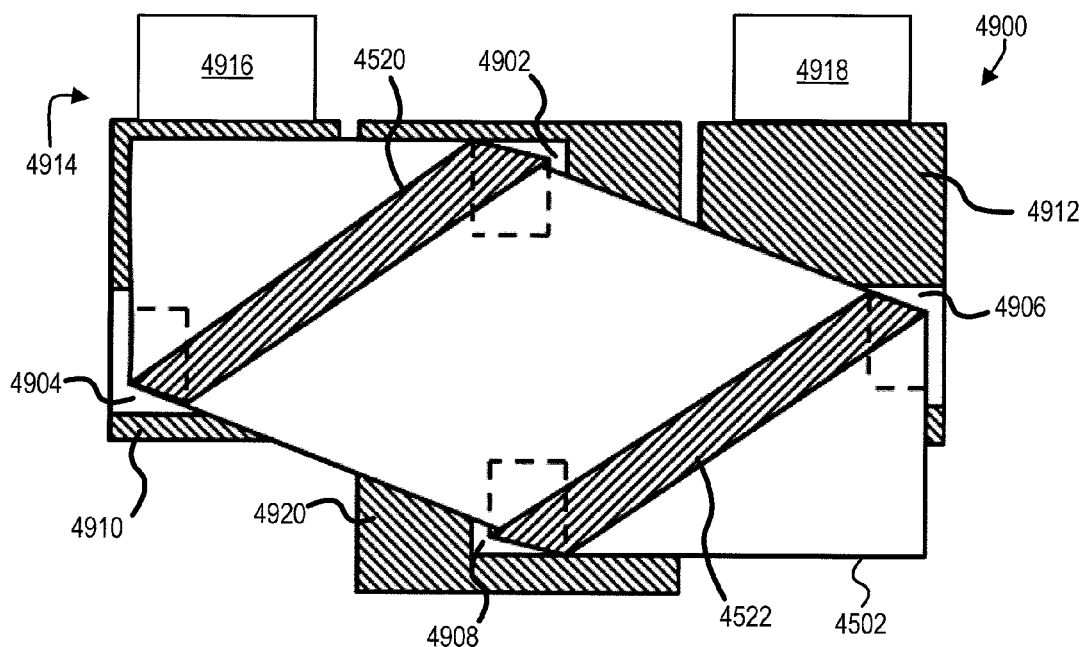
FIG. 49 shows a top cross sectional view of the coupled inductor of FIGS. 45-46 installed on one PCB layout, according to an embodiment.

FIG. 49 shows a top cross sectional view of an embodiment of coupled inductor 4500 taken along line A-A of FIG. 45 and installed on one possible DC-to-DC converter PCB layout 4900. Layout 4900, for example, forms part of a buck converter or a boost converter. However, coupled inductor 4500 is not limited to PCB layout 4900. Layout 4900 includes PCB pads 4902, 4904, 4906, 4908 for respectively coupling to solder tabs 4524, 4526, 4528, 4530 of coupled inductor 4900. The outlines of solder tabs 4524, 4526, 4528, and 4530 are shown by dashed lines in FIG. 49 where obscured by core 4502. A PCB conductive trace 4910, which forms part of a switching node, electrically couples pad 4904 to a switching circuit 4916, and a PCB conductive trace 4912, which forms part of another switching node, electrically couples pad 4906 to a switching circuit 4918. Switching node traces 4910, 4912 extend from a common side 4914 of coupled inductor 4500, thereby allowing placement of both switching power stages 4916, 4918 on the same side of coupled inductor 4900, as shown in FIG. 49. PCB conductive trace 4920, which forms part of a common node, electrically couples pads 4902, 4908. It should be appreciated that PCB conductive trace 4920 is wide, thereby promoting low impedance on the common node. Furthermore, trace 4920 has a simple, rectangular shape, thereby promoting manufacturing robustness of the FIG. 49 layout.

Layout 4900 is part of, for example, a buck DC-to-DC converter where switching circuits 4916, 4918 respectively switch solder tabs 4526, 4528 between an input voltage and ground, and conductive trace 4920 electrically couples to an output node. As another example, layout 4900 could be part of a boost DC-to-DC converter where switching circuits 4916, 4918 respectively switch solder tabs 4526, 4528 between an output voltage and ground, and conductive trace 4920 electrically couples to an input voltage node.

Figure 50:
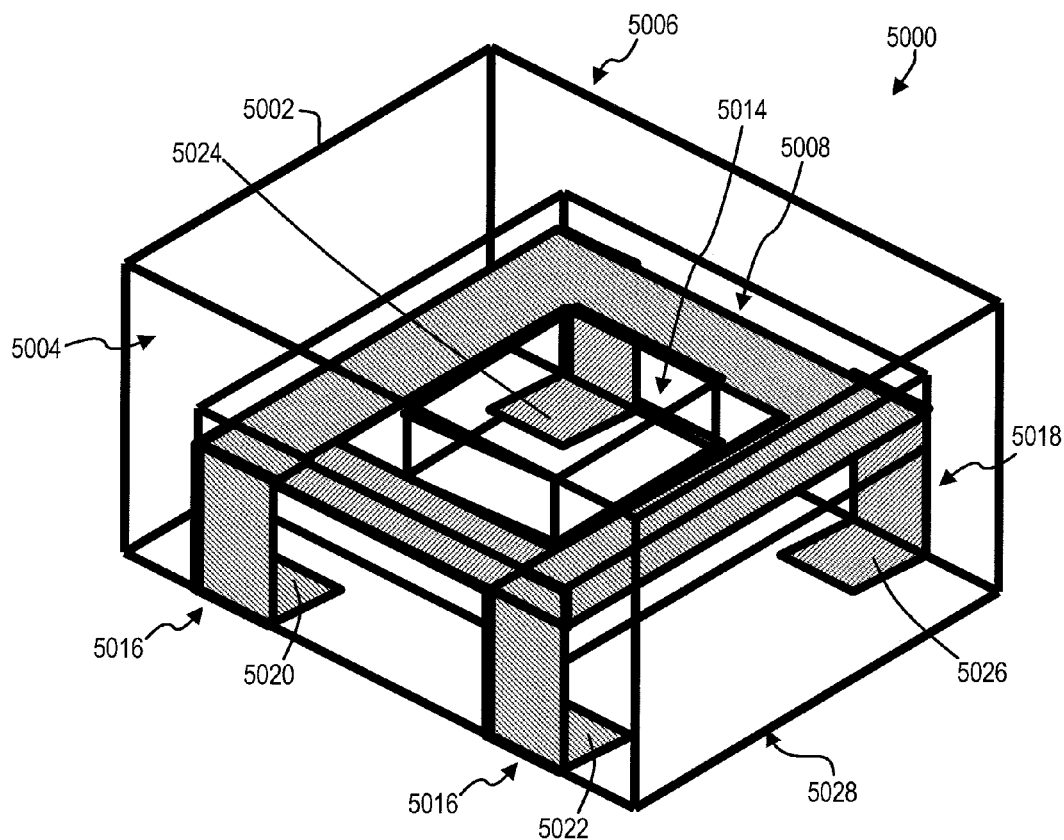
FIG. 50 shows a perspective view and FIG. 51 shows a side view of another two-phase coupled inductor, according to an embodiment.
Figure 51:
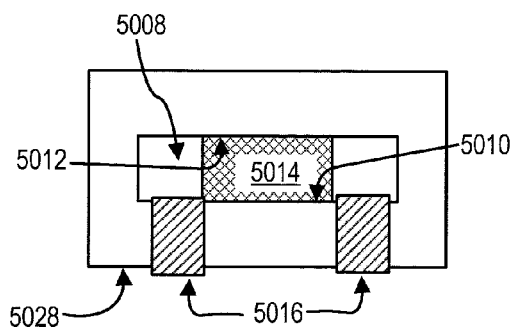

FIG. 50 shows a perspective view of one two-phase coupled inductor 5000. Coupled inductor 5000 includes a magnetic core 5002 (shown as transparent in FIG. 50) including a first side 5004 and a second side 5006 opposite first side 5004. Magnetic core 5002 forms a passageway 5008 extending from first side 5004 to second side 5006. FIG. 51 shows side 5004 of coupled inductor 5000. Passageway 5008 is partially defined by first and second opposing surfaces 5010, 5012, and a leg 5014 connects opposing surfaces 5010, 5012.

Coupled inductor 5000 further includes windings 5016, 5018 that are, for example, foil windings to promote low impedance and low manufacturing cost. Winding 5016 is wound at least partially around leg 5014 in passageway 5008. A first end of winding 5016 extends from first side 5004 of core 5002 and forms a first solder tab 5020, and a second end of winding 5016 extends from first side 5004 of core 5002 and forms a second solder tab 5022. A first end of winding 5018 extends from second side 5006 of core 5002 and forms a third solder tab 5024, and a second end of winding 5018 extends from second side 5006 of core 5002 and forms a fourth solder tab 5026. Solder tabs 5020, 5022, 5024, 5026 are, for example, disposed along a bottom surface 5028 of core 5002.

Coupled inductor 5000 is configured such that a current flowing through winding 5016 from first solder tab 5020 to second solder tab 5022 induces a current flowing through winding 5018 from third solder tab 5024 to fourth solder tab 5026. Similarly, a current flowing through winding 5018 from third solder tab 5024 to fourth solder tab 5026 induces a current flowing through winding 5016 from first solder tab 5020 to second solder tab 5022.

Figure 52:
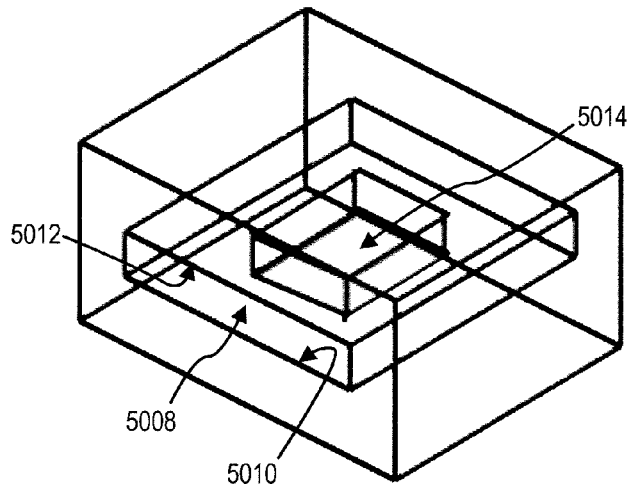
FIG. 52 shows a perspective view of the magnetic core of the coupled inductor of FIGS. 50-51 without the windings of the coupled inductor.
Figure 53:
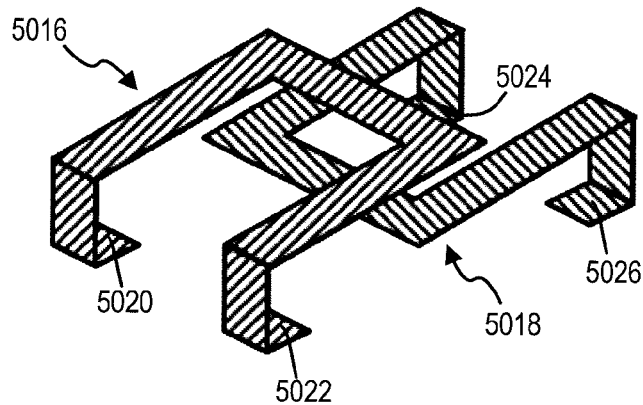
FIGS. 53 and 54 show perspective views of the windings of the coupled inductor of FIGS. 50-51 removed from the magnetic core of the coupled inductor.
Figure 54:
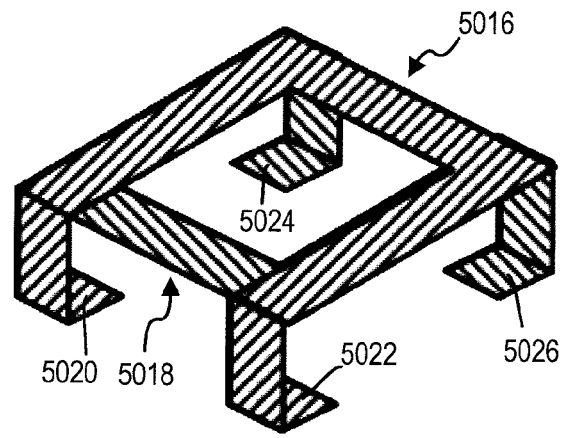

FIG. 52 shows a transparent perspective view of core 5002 with windings 5016, 5018 removed. FIG. 53 shows a perspective view of windings 5016, 5018 separated from core 5002 and from each other. However, windings 5016, 5018 at least partially overlap when installed in coupled inductor 5002. FIG. 54 shows a perspective view of windings 5016, 5018 separated from core 5002 but overlapping as they would when installed in coupled inductor 5000. Although winding 5016 is shown stacked on winding 5018, winding 5018 alternately is stacked on winding 5016. Windings 5016, 5018 are insulated at least where they overlap, such as by an insulating tape or varnish, or other insulating coating, on one or more of windings 5016, 5018.

Figure 55:
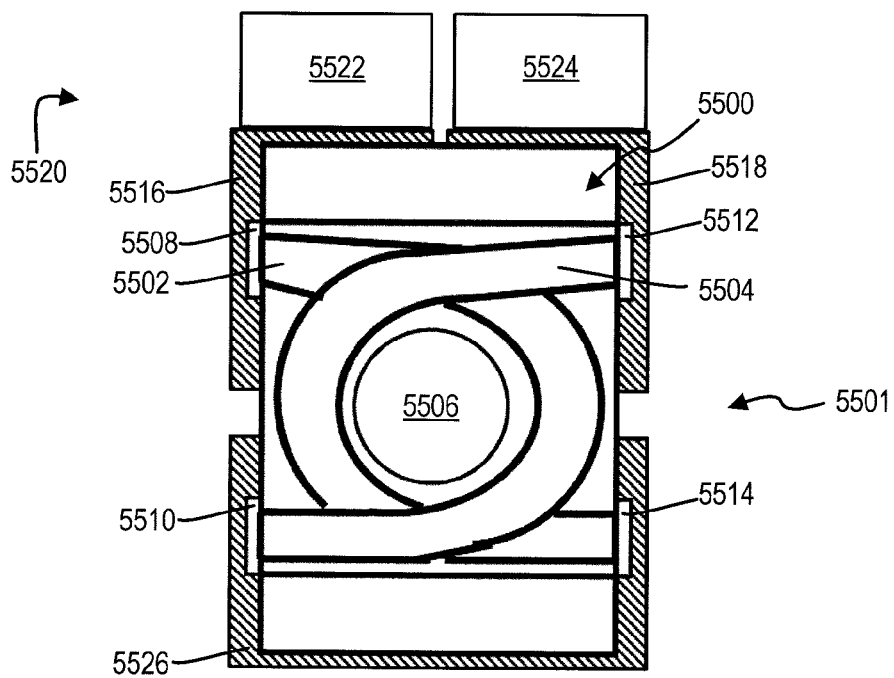
FIG. 55 shows a top cross sectional view of a two-phase coupled inductor installed on one PCB layout, according to an embodiment.

Windings 5016, 5018 are shown as rectangular shaped foil windings, such as shown in FIGS. 50 and 53-54. Rectangular shaped foil windings can be stamped into shape and therefore are typically easier to assemble with magnetic cores than helical windings. Foil windings are also less susceptible to the skin effect than cylindrical windings, thereby promoting low winding impedance. However, the configuration of winding 5016, 5018 could be varied. For example, FIG. 55 shows a top cross sectional view of coupled inductor 5500 installed on one possible DC-to-DC converter PCB layout 5501. Layout 5501, for example, forms part of a buck converter or a boost converter. Coupled inductor 5500 is similar to coupled inductor 5000, but coupled inductor 5500 includes helical windings 5502, 5504 instead of stamped rectangular windings and a rounded leg 5506 instead of a rectangular leg connecting opposing passageway surfaces.

The FIG. 55 layout includes PCB pads 5508, 5510 for coupling to respective solder tabs of winding 5502 and PCB pads 5512, 5514 for coupling to respective solder tabs of winding 5504. A PCB conductive trace 5516, which forms part of a switching node, electrically couples pad 5508 to a switching circuit 5522, and a PCB conductive trace 5518, which forms part of another switching node, electrically couples pad 5512 to a switching circuit 5524. Switching node traces 5516, 5518 extend from a common side 5520 of coupled inductor 5500, thereby allowing placement of both switching circuits 5522, 5524 on the same side of coupled inductor 5500, as shown in FIG. 55. It should also be noted that a PCB conductive trace 5526, which forms part of a common node and electrically couples together pads 5510, 5514, is short and wide, thereby promoting low impedance on the common node. Furthermore, trace 5526 and has simple, rectangular shape, thereby promoting manufacturing robustness of the FIG. 55 layout. Certain embodiments of coupled inductor 5000 of FIG. 50 could also be used with the PCB layout of FIG. 55.

Layout 5501 is part of, for example, a buck DC-to-DC converter where switching circuits 5522, 5524 respectively switch a solder tab of windings 5502, 5504 between an input voltage and ground, and conductive trace 5526 electrically couples to an output node. As another example, layout 5501 could be part of a boost DC-to-DC converter where switching circuits 5522, 5524 respectively switch a solder tab of windings 5502, 5504 between an output voltage and ground, and conductive trace 5526 electrically couples to an input voltage node.

FIG. 56 shows another variation of coupled inductor 5000 of FIG. 50. In particular, FIG. 56 shows a perspective view of one two-phase coupled inductor 5600, which is similar to coupled inductor 5000, but coupled inductor 5600 includes windings 5602, 5604 extending from a first side 5606 of a magnetic core 5608 (shown as transparent in FIG. 56) to a second side 5610 of core 5608. FIG. 57 shows first side 5606 of coupled inductor 5600. Winding 5602 includes an intermediate portion 5612 disposed along second side 5610 of magnetic core 5608, and winding 5604 includes an intermediate portion 5614 disposed along first side 5606 of core 5608. Intermediate portions 5612, 5614 may help hold inductor 5600 together, thereby promoting its mechanical robustness. Additionally, the fact that intermediate portions 5612, 5614 are disposed outside of a passageway 5616 of magnetic core 5608 allows for a leg 5618 connecting opposing portions 5620, 5622 of passageway 5616 to occupy a large portion of passageway 5616, thereby increasing the size of leg 5618 and decreasing core losses in leg 5618. For example, leg 5618 may extend from first side 5606 to second side 5610 of core 5608, as shown in FIG. 56.

Figure 59:
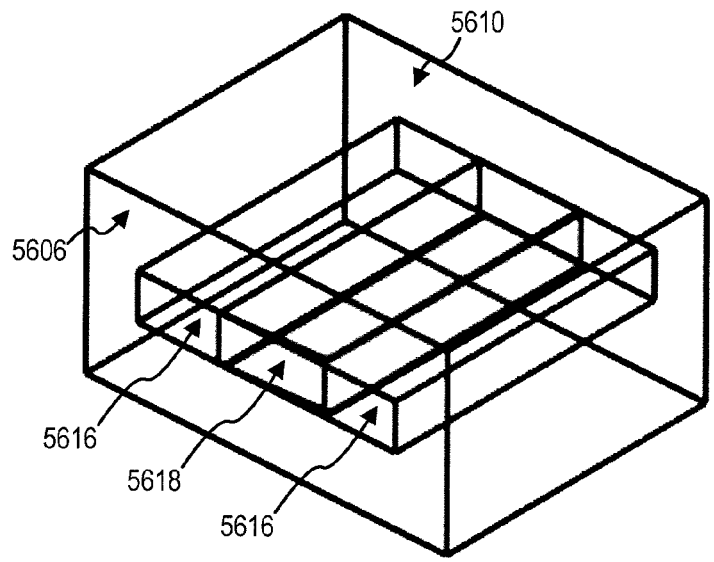
FIG. 59 shows a perspective view of the magnetic core of the coupled inductor of FIGS. 56-58 without the windings of the coupled inductor.
Figure 60:
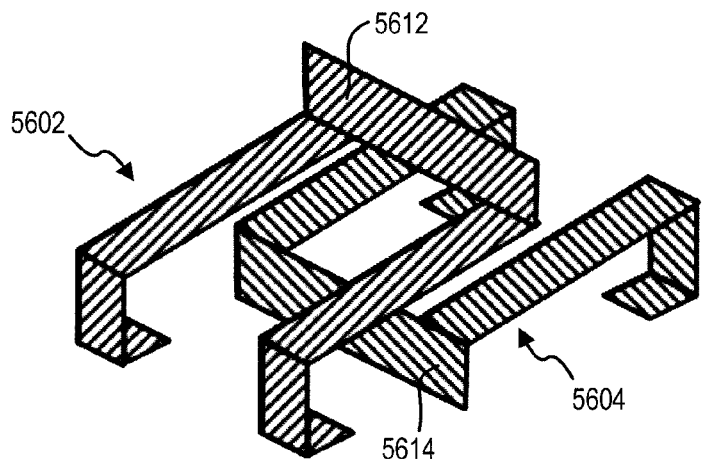
FIGS. 60 and 61 show perspective views of the windings of the coupled inductor of FIGS. 56-58 removed from the magnetic core of the coupled inductor.
Figure 61:
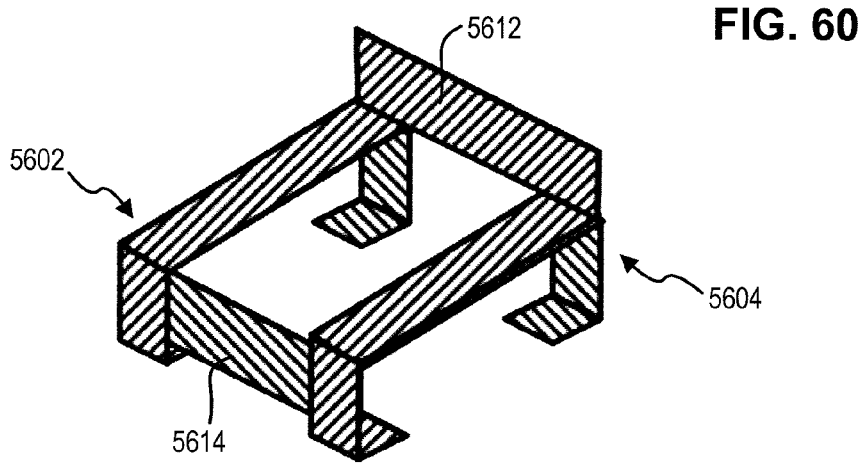

FIG. 58 shows a top cross sectional view of coupled inductor 5600 taken along line A-A of FIG. 56 and installed on a PCB layout similar to that of FIG. 55. FIG. 59 shows a transparent perspective view of magnetic core 5608 with windings 5602, 5604 removed. FIG. 60 shows a perspective view of windings 5602, 5604 removed from magnetic core 5608 and separated from each other, and FIG. 61 shows a perspective view of windings 5602, 5604 overlapping as they would when installed in coupled inductor 5600. Although winding 5602 is shown stacked on winding 5604, the stacking order could be reversed. Additionally, the configuration of intermediate portions 5612, 5614 could be varied, for example, such that intermediate portions 5612, 5614 extend in a different direction relative to passageway 5616. For example, intermediate portions 5612, 5614 could be alternately configured such that intermediate portion 5612 extends downward with respect to passageway 5616, and intermediate portion 5614 extends upward with respect to passageway 5616.

Figure 62:
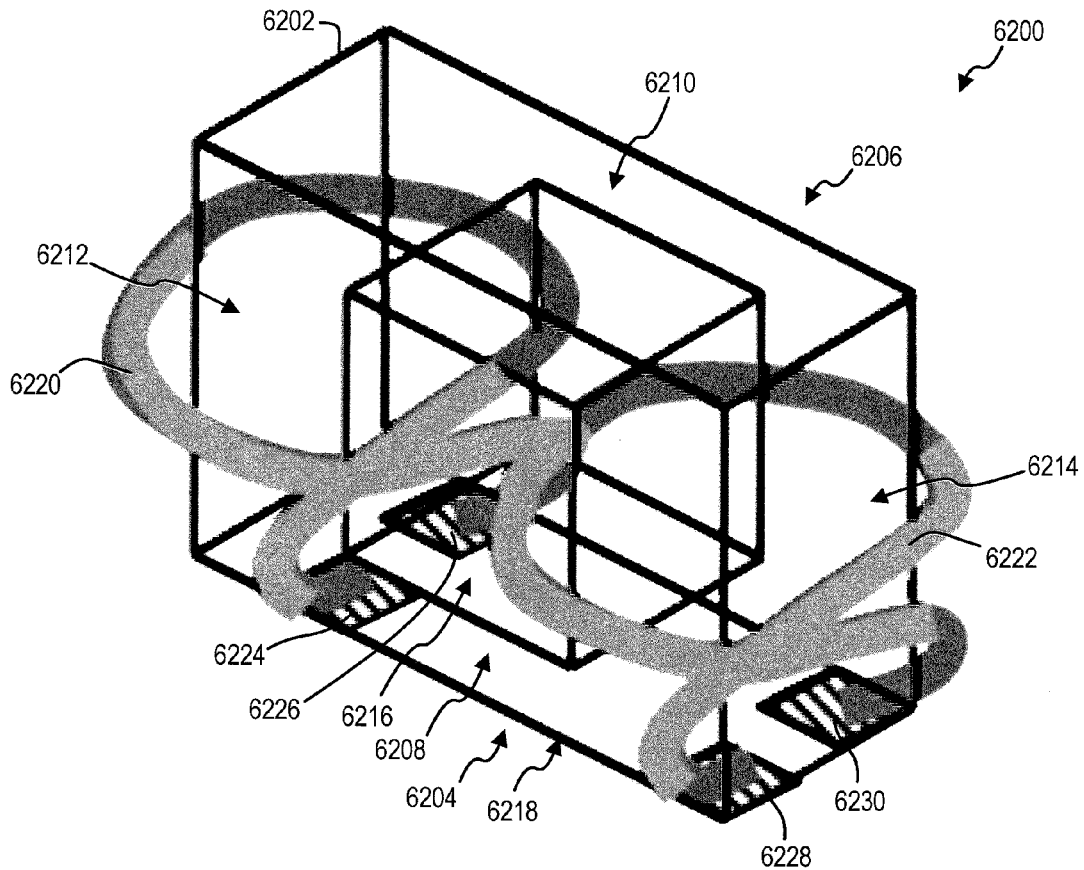
FIG. 62 shows a perspective view of another two-phase coupled inductor, according to an embodiment.

FIG. 62 shows a perspective view of one two-phase coupled inductor 6200 including a magnetic core 6202 including a first side 6204 and an opposite second side 6206. Magnetic core 6202 further includes end magnetic elements 6208, 6210 and legs 6212, 6214 disposed between and connecting end magnetic elements 6208, 6210. Magnetic core 6202 forms a passageway 6216 extending through core 6202 from first side 6204 to second side 6206, and passageway 6216 is partially defined by legs 6212, 6214. Magnetic core 6202 further includes a bottom surface 6218, which for example, connects first and second sides 6204, 6206. In certain embodiments, bottom surface 6218 is at least substantially orthogonal to first and second sides 6204, 6206.

Coupled inductor 6200 further includes winding 6220 wound around leg 6212 and through passageway 6216, as well as winding 6222 wound around leg 6214 and through passageway 6216. A first end of winding 6220 extends from first side 6204 of core 6202 and electrically couples to a first solder tab 6224, and a second end of winding 6220 extends from second side 6206 of core 6202 and electrically couples to a second solder tab 6226. A first end of winding 6222 extends from first side 6204 of core 6202 and electrically couples to a third solder tab 6228, and a second end of winding 6222 extends from second side 6206 of core 6202 and electrically couples to a fourth solder tab 6230. Solder tabs 6224, 6226, 6228, 6230 are, for example, disposed along bottom surface 6218, such as shown in FIG. 62. Some or all of passageway 6216 between windings 6220, 6222 is optionally partially or fully filled with magnetic material to increase leakage inductance values of windings 6220, 6222 when used in a circuit.

Figure 63:
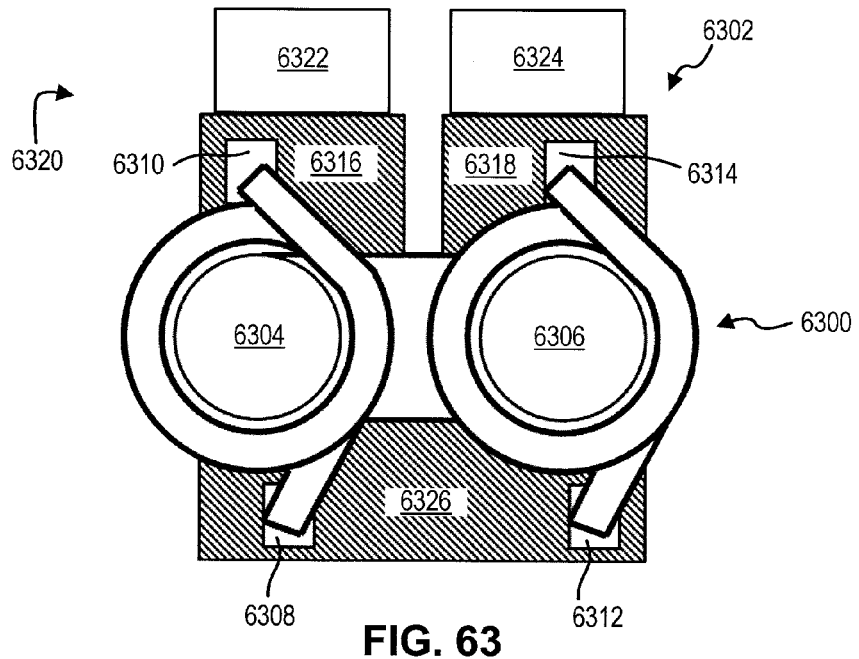
FIG. 63 shows a top cross sectional view of a two-phase coupled inductor installed on one PCB layout, according to an embodiment.

Windings 6220 and 6222 are wound about their respective legs 6212, 6214 such that a current flowing through winding 6220 from second solder tab 6226 to first solder tab 6224 induces an electric current flowing through winding 6222 from fourth solder tab 6230 to third solder tab 6228. Similarly, a current flowing through second winding 6222 from fourth solder tab 6230 to third solder tab 6228 induces a current flowing through first winding 6220 from second solder tab 6226 to first solder tab 6224. Such feature advantageously enables coupled inductor 6200 to be used, for example, in a DC-to-DC converter where all switching power stages are disposed on a common side of coupled inductor 6200. For example, FIG. 63 shows a top cross sectional view of one coupled inductor 6300 installed on a PCB layout 6302. Layout 6302 is, for example, a buck DC-to-DC converter or a boost DC-to-DC converter layout. Coupled inductor 6300 is similar to coupled inductor 6200 of FIG. 62, but coupled inductor 6300 includes cylindrical legs 6304, 6306 instead of rectangular legs.

Layout 6302 includes pads 6308, 6310, 6312, 6314 for respectively coupling to solder tabs 6224, 6226, 6228, 6230 of coupled inductor 6300. A PCB conductive trace 6316, which forms part of a switching node, electrically couples pad 6310 to a switching circuit 6322, and a PCB conductive trace 6318, which forms part of a switching node, electrically couples pad 6314 to a switching circuit 6324. Switching traces 6316, 6318 extend from a common side 6320 of coupled inductor 6300, thereby allowing placement of both switching circuits 6322, 6324 on the same side of coupled inductor 6300, as shown in FIG. 63. It should also be noted that a PCB conductive trace 6326, which forms part of a common node and electrically couples together pads 6308, 6312, is short and wide, thereby promoting low impedance on the common node. Furthermore, trace 6326 has simple, rectangular shape, thereby promoting manufacturing robustness of layout 6302. Certain embodiments of coupled inductor 6200 of FIG. 62 could also be used layout 6302.

Layout 6302 is part of, for example, a buck DC-to-DC converter where switching circuits 6322, 6324 respectively switch solder tabs 6226, 6230 between an input voltage and ground, and conductive trace 6326 electrically couples to an output node. As another example, layout 6302 could be part of a boost DC-to-DC converter where switching circuits 6322, 6324 respectively switch solder tabs 6226, 6230 between an output voltage and ground, and conductive trace 6326 electrically couples to an input voltage node.

As discussed above, one possible use of the coupled inductors disclosed herein is in switching power supplies, such as in switching DC-to-DC converters. Accordingly, the magnetic cores of the coupled inductors discussed herein are typically formed of a magnetic material (e.g., a ferrite material or a powdered iron material) that exhibits a relatively low core loss at high switching frequencies (e.g., at least 20 KHz) that are common in switching power supplies.

Figure 64:
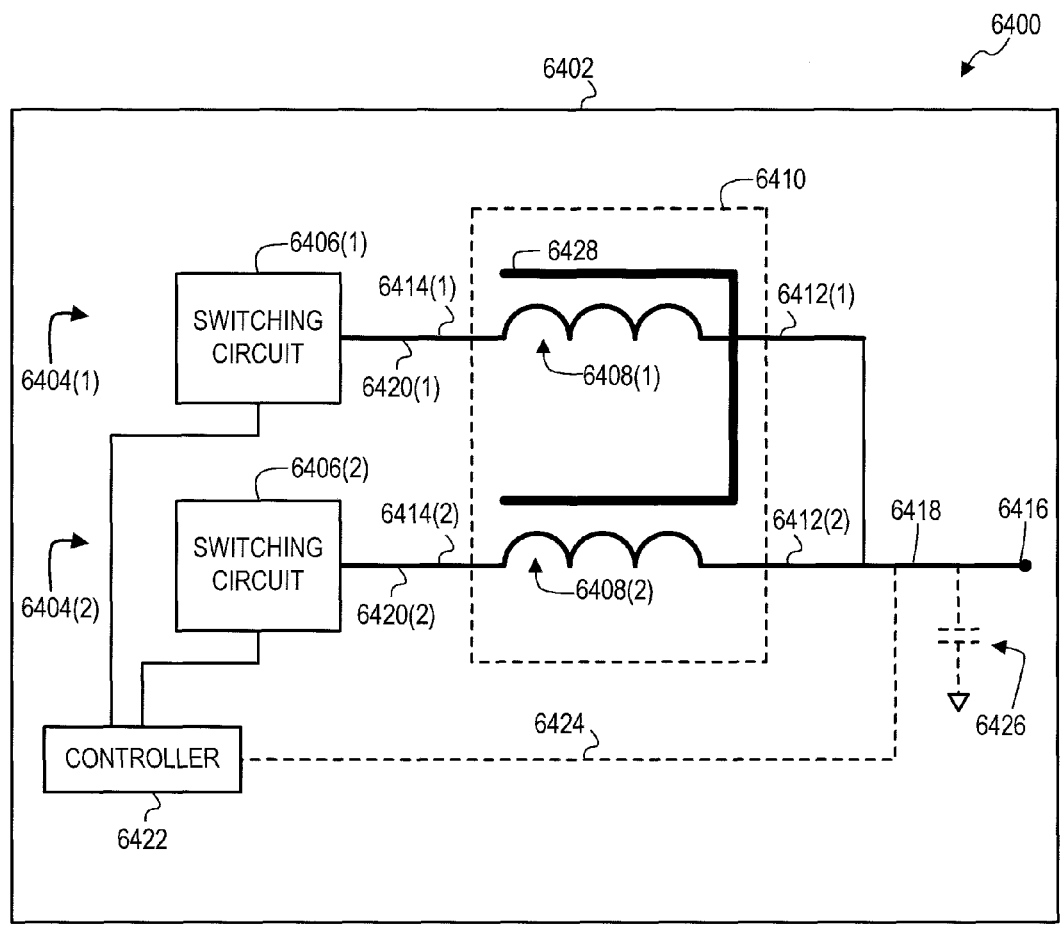
FIG. 64 shows a schematic of a power supply, according to an embodiment.

For example, FIG. 64 schematically shows one power supply 6400, which is one possible application of the inductors discussed herein. Power supply 6400 includes a PCB 6402 for supporting and electrically connecting components of power supply 6400. PCB 6402 could alternately be replaced with a number of separate, but electrically interconnected, PCBs.

Power supply 6400 is shown as including two phases 6404, where each phase includes a respective switching circuit 6406 and a winding 6408 of a two-phase coupled inductor 6410. However, power supply 6400 could be modified to have a different number of phases 6404, such as four phases, where a first pair of phases utilizes windings of a first two-phase coupled inductor, and a second pair of phases utilizes windings of a second two-phase coupled inductor. Examples of two-phase coupled inductor 6410 include coupled inductor 700 (FIG. 7), coupled inductor 1200 (FIG. 12), coupled inductor 1500 (FIG. 15), coupled inductor 2000 (FIG. 20), coupled inductor 2300 (FIG. 23), coupled inductor 2500 (FIG. 25), coupled inductor 3000 (FIG. 30), coupled inductor 3400 (FIG. 34), coupled inductor 3600 (FIG. 36), coupled inductor 4100 (FIG. 41), coupled inductor 4500 (FIG. 45), coupled inductor 5000 (FIG. 50), coupled inductor 5500 (FIG. 55), coupled inductor 5600 (FIG. 56), coupled inductor 6200 (FIG. 62), and coupled inductor 6300 (FIG. 63).

Each winding 6408 has a respective first terminal 6412 and a respective second terminal 6414. First and second terminals 6412, 6414, for example, form surface mount solder tabs suitable for surface mount soldering to PCB 6402. For example, in an embodiment where coupled inductor 6410 is an embodiment of coupled inductor 700 (FIG. 7), first terminal 6412(1) represents solder tab 718, second terminal 6414(1) represents solder tab 716, first terminal 6412(2) represents solder tab 722, and second terminal 6414(2) represents solder tab 720. Coupled inductor 6410 is configured such that it has inverse magnetic coupling. Therefore, an electric current flowing through winding 6408(1) from second terminal 6414(1) to first terminal 6412(1) induces an electric current in winding 6408(2) flowing from second terminal 6414(2) to first terminal 6412(2). Similarly, a current flowing through winding 6408(2) from second terminal 6412(2) to first terminal 6412(2) induces a current flowing through winding 6408(1) flowing from second terminal 6414(1) to first terminal 6412(1).

Each first terminal 6412 is electrically connected to a common first node 6416, such as via a PCB trace 6418. Each second terminal 6414 is electrically connected to a respective switching circuit 6406, such as by a respective PCB trace 6420. Switching circuits 6406 are configured and arranged to switch second terminal 6414 of their respective winding 6408 between at least two different voltage levels. Controller 6422 controls switching circuits 6406, and controller 6422 optionally includes a feedback connection 6424, such as to first node 6416. First node 6416 optionally includes a filter 6426.

Power supply 6400 typically has a switching frequency, the frequency at which switching circuits 6406 switch, of at least about 20 kHz, such that sound resulting from switching is above a frequency range perceivable by humans. Operating switching power supply 6400 at a high switching frequency (e.g., at least 20 kHz) instead of at a lower switching frequency may also offer advantages such as (1) an ability to use smaller energy storage components (e.g., coupled inductor 6410 and filter capacitors), (2) smaller ripple current and ripple voltage magnitude, and/or (3) faster converter transient response. To enable efficient operation at high switching frequencies, the one or more magnetic materials forming a magnetic core 6428 of coupled inductor 6410 are typically materials having relatively low core losses at high frequency operation, such as ferrite materials or powdered iron materials.

In some embodiments, controller 6422 controls switching circuits 6406 such that each switching circuit 6406 operates out of phase from each other switching circuit 6406. Stated differently, in such embodiments, the switched waveform provided by each switching circuit 6406 to its respective second terminal 6414 is phase shifted with respect to the switched waveform provided by each other switching circuit 6406 to its respective second terminal 6414. For example, in certain embodiments of power supply 6400, switching circuit 6406(1) provides a switched waveform to second terminal 6414(1) that is about 180 degrees out of phase with a switched waveform provided by switching circuit 6406(2) to second terminal 6414(2).

Power supply 6400 can be configured to have a variety of configurations. For example, switching circuits 6406 may switch their respective second terminals 6414 between an input voltage node (not shown) and ground, such that power supply 6400 is configured as a buck converter, first node 6416 is an output voltage node, and filter 6426 is an output filter. In this example, each switching circuit 6406 includes at least one high side switching device and at least one catch diode, or at least one high side switching device and at least one low side switching device. In the context of this document, a switching device includes, but is not limited to, a bipolar junction transistor, a field effect transistor (e.g., an N-channel or P-channel metal oxide semiconductor field effect transistor, a junction field effect transistor, or a metal semiconductor field effect transistor), an insulated gate bipolar junction transistor, a thyristor, or a silicon controlled rectifier.

In embodiments where power supply 6400 is a DC-to-DC converter, power supply 6400 may utilize one of the PCB layouts discussed above, such as PCB layout 1100 (FIG. 11), 1900 (FIG. 19), 2900 (FIG. 29), 3300 (FIG. 33), 4000 (FIG. 40), 4900 (FIG. 49), 5501 (FIG. 55), or 6302 (FIG. 63). For example, if power supply 6400 is a buck converter using inductor 700 with PCB layout 1100, switching circuits 1116, 1118 of layout 1100 correspond to switching circuits 6406(1), 6406(2) of power supply 6400, and switching node traces 1110, 1112 of layout 1100 correspond to traces 6420(1), 6420(2) of power supply 6400.

As another example, power supply 6400 can be configured as a boost converter such that first node 6416 is an input power node, and switching circuits 6406 switch their respective second terminal 6414 between an output voltage node (not shown) and ground. Additionally, power supply 6400 can be configured, for example, as a buck-boost converter such that first node 6416 is a common node, and switching circuits 6406 switch their respective second terminal 6414 between an output voltage node (not shown) and an input voltage node (not shown).

Furthermore, as yet another example, power supply 6400 may form an isolated topology. For example, each switching circuit 6406 may include a transformer, at least one switching device electrically coupled to the transformer's primary winding, and a rectification circuit coupled between the transformer's secondary winding and the switching circuit's respective second terminal 6414. The rectification circuit optionally includes at least one switching device to improve efficiency.

Changes may be made in the above methods and systems without departing from the scope hereof. For example, although many of the embodiments disclosed above are illustrated with rectangular shaped magnetic cores, the magnetic core shapes could be varied. For example, one or more edges of the magnetic cores could be rounded, or one or more rectangular magnetic core elements could be replaced with cylindrical magnetic elements. As another example, although windings are generally shown above as single turn windings, one or more of the windings could alternately be multi turn windings. As yet another example, although the embodiments shown above are generally shown with solder tabs for electrically coupling windings to PCB pads, the solder tabs could be replaced with another type of terminal, such as through-hole pins. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A two-phase coupled inductor, comprising:
   a magnetic core having opposing first and second side outer surfaces;
   a first winding having opposing first and second ends and a first upper portion between the first and second ends; and
   a second winding having opposing third and fourth ends and a second upper portion between the third and fourth ends;
   the first and second upper portions each extending through the magnetic core from the first side outer surface to the second side outer surface;
   the first and third ends extending out of the magnetic core from the first side outer surface to form a first solder tab and a third solder tab, respectively;
   the second and fourth ends extending out of the magnetic core from the second side outer surface to form a second solder tab and a fourth solder tab, respectively;
   each of the first, second, third, and fourth solder tabs overlapping with each other, when seen looking cross-sectionally in a widthwise direction of the magnetic core, the widthwise direction being substantially parallel to the first and second side outer surfaces;
   each of the solders tabs being adapted for surface mount soldering to a common planar sudstrate;
   the second solder tab being disposed between the first and fourth solder tabs, when seen looking cross-sectionally in the widthwise direction; and
   the fourth solder tab being disposed between the second and third solder tabs, when seen looking cross-sectionally in the widthwise direction.

2. The two-phase coupled inductor of claim 1, each of the solder tabs being disposed on a bottom outer surface of the magnetic core, opposing the first and second upper portions.

3. The two-phase coupled inductor of claim 2, the bottom outer surface being substantially perpendicular to each of the first and second side outer surfaces.

4. The two-phase coupled inductor of claim 1, the magnetic core forming a passageway extending from the first side outer surface to the second side outer surface, the first and second upper portions each extending through the passageway, and the first and second upper portions being separated from each other in the widthwise direction along the passageway.

5. The two-phase coupled inductor of claim 1, each of the first and second upper portions extending through the magnetic core from the first side outer surface to the second side outer surface without forming a turn.

6. The two-phase coupled inductor of claim 1, wherein:
   the first and second side outer surfaces are separated from each other in a lengthwise direction of the magnetic core, perpendicular to the widthwise direction of the magnetic core;
   the first upper portion extends diagonally through the magnetic core from the first side outer surface to the second side outer surface in a first plane parallel to the widthwise and lengthwise directions; and
   the second upper portion extends diagonally through the magnetic core from the first side outer surface to the second side outer surface in a second plane parallel to the widthwise and lengthwise directions.

7. The two-phase coupled inductor of claim 1, wherein:
   a width of the first upper portion is substantially equal to a respective width of each of the first and second solder tabs; and
   a width of the second upper portion is substantially equal to a respective width of each of the third and fourth solder tabs.

8. The two-phase coupled inductor of claim 1, wherein:
   a width of the first upper portion is substantially greater than a respective width of each of the first and second solder tabs; and
   a width of the second upper portion is substantially greater than a respective width of each of the third and fourth solder tabs.

9. The two-phase coupled inductor of claim 1, wherein the first and second upper portions do not cross in the magnetic core.

* * * * *